(12) United States Patent
Naskar et al.

(10) Patent No.: US 11,441,035 B2
(45) Date of Patent: Sep. 13, 2022

(54) FUNCTIONAL LIGNIN, AND ITS USE IN PRODUCING BLENDS, COPOLYMERS, AND SELF-HEALING ELASTOMERS

(71) Applicant: UT-Battelle, LLC, Oak Ridge, TN (US)

(72) Inventors: Amit K. Naskar, Knoxville, TN (US); Mengmeng Cui, Kingsport, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 16/277,020

(22) Filed: Feb. 15, 2019

(65) Prior Publication Data

US 2019/0256709 A1     Aug. 22, 2019

Related U.S. Application Data

(60) Provisional application No. 62/631,534, filed on Feb. 16, 2018.

(51) Int. Cl.
 *C08L 97/00* (2006.01)
 *C08L 71/08* (2006.01)
 (Continued)

(52) U.S. Cl.
 CPC .............. *C08L 97/005* (2013.01); *C08H 6/00* (2013.01); *C08L 9/02* (2013.01); *C08L 71/08* (2013.01); *C08L 77/06* (2013.01); *C08L 2205/03* (2013.01)

(58) Field of Classification Search
 CPC ........ C08L 97/005; C08L 71/08; C08L 77/06; C08L 9/02; C08H 6/00; C08H 8/00
 See application file for complete search history.

(56) References Cited

U.S. PATENT DOCUMENTS 8,748,537 B2  6/2014  Naskar et al.
9,815,985 B2  11/2017  Naskar et al.
(Continued)

OTHER PUBLICATIONS

Roland Mork, Hirohiza Yoshida & Knut P. Kringstad, "Fractionation of Kraft Lignin by Successive Extraction with Organic Solvents I. Functional Groups, 13C-NMR-Spectra and Molecular Weight Distributions," 40 Holzforschung 51 (1986).*

(Continued)

*Primary Examiner* — Nicholas E Hill
(74) *Attorney, Agent, or Firm* — Scully, Scott, Murphy & Presser, P.C.

(57) ABSTRACT

A composition comprising lignin compounds possessing 8-30 (or 5-15 or 8-12) phenyl rings interconnected by ether and alkylene linkages and containing hydroxy and/or methoxy groups attached to said phenyl rings, wherein said composition possesses a glass transition temperature of 80-100° C. (or 95-98° C.) and a degree of substitution (DS) of carboxylic acid groups per phenyl ring of at least 0.5 and a DS of methoxy groups per phenyl ring of no more than 1.2, 1.1, or 1.0, wherein at least 90 wt % of said lignin compounds has a molecular weight within a range of 500-5000 g/mol, 1500-3000 g/mol, or 2000-2500 g/mol and/or wherein the molecular weight distribution of the lignin compounds is characterized by a polydispersity index of 1.0-1.5, 1.0-1.4, or 1.0-1.3, and wherein other lignin compounds not possessing the above characteristics are not present. Methods for producing the lignin extract and lignin copolymers and blends produced therefrom are also described.

6 Claims, 16 Drawing Sheets

(51) Int. Cl.
*C08L 77/06* (2006.01)
*C08H 7/00* (2011.01)
*C08L 9/02* (2006.01)

(56) References Cited

U.S. PATENT DOCUMENTS

| | | | |
|---|---|---|---|
| 2015/0041083 A1* | 2/2015 | Yoshikawa | D21H 17/06 |
| | | | 162/19 |
| 2015/0368471 A1 | 12/2015 | Naskar | |
| 2016/0002467 A1 | 1/2016 | Erdmann et al. | |
| 2016/0222151 A1 | 8/2016 | Chung | |

OTHER PUBLICATIONS

Hirohisa Yoshida, Roland Morck & Knut P. Krigstad, "Fractionation of Kraft Lignin by Successive Extraction with Organic Solvents II. Thermal Properties of Kraft Lignin Fractions,"41 Holzforschung 171(1987).*

Chengzhong Cui, Runkun Sun & Dimitris S. Argyropoulos, "Fractional Precipitation of Softwood Kraft Lignin: Isolation of Narrow Fractions Common to a Variety of Lignins," 2 ACS Sustainable Chem. Eng. 959 (2014).*

Angela P. Dodd, John F. Kadla & Suzana K. Straus, "Characterization of Fractions Obtained from Two Industrial SOftwood Kraft Lignins," 3 ACS Sustainable Chem. Eng. 103 (2015).*

Valeria Passoni et al., "Fractionation of Industrial Softwood Kraft Lignin: Solvent Selection as a Tool for Tailored Material Properties," 4 ACS Sustainable Chem. Eng. 2232 (2016).*

Achinivu E.C., "Protic Ionic Liquids for Lignin Extraction—A Lignin Characterization Study", International Journal of Molecular Sciences 19(2):428, pp. 1-14 (Jan. 31, 2018) and Supplementary Information.

Li H-L et al., "Optimizing Extraction and Structural Characterization of Organosolv Lignin from Wheat Straw", Cellulose Chemistry and Technology 51(5-6):433-445 (2017).

Rojas O.J. et al., "Lignin Separation from Kraft Black Liquors by Tangential Ultrafiltration", La Chimica e l'Industria 1:88-95 (2006).

Sun Q. et al., "A Study of Poplar Organosolv Lignin After Melt Rheology Treatment as Carbon Fiber Precursors", Green Chemistry 18(18):5015-5024 (2016).

Lignin, Organosolv; PubChem CID 73555271, [retrieved on Apr. 30, 2019], retrieved from the Internet: <https://pubchem.ncbi.nlm.nih.gov/compound/73555271>, pp. 1-6 (May 8, 2014).

International Search Report & Written Opinion dated Jun. 20, 2019 received in International Application No. PCT/US19/18194.

Muhammad N. et al., "Investigations of novel nitrile-based ionic liquids as pre-treatment solvent for extraction of lignin from bamboo biomass", Journal of Industrial and Engineering Chemistry, (2013), 19, pp. 207-214 http://dx.doi.org/10.1016/j.jiec.2012.08.003.

Cul, M., et al., "Rigid Oligomer from Lignin in Designing of Tough, Self-Healing Elastomers", ACS Macro Letters 2018, Received Aug. 9, 2018, Accepted Sep. 20, 2018, Published, Oct. 16, 2018, pp. 1328-1332, Supporting Information pp. 1-10.

Saito, T. et al., "Methanol Fractionation of Softwood Kraft Lignin: Impact on the Lignin Properties", ChemSusChem 2014, Received May 24, 2013, Revised Jul. 26, 2013, Published online on Nov. 4, 2013, pp. 221-228.

Tran, C.D., et al., "A New Class of Renewable Thermoplastics with Extraordinary Performance from Nanostructured Lignin-Elastomers", Advanced Functional Materials, 2016, 26, pp. 2677-2685.

* cited by examiner

3I

3J

4C

4D

FUNCTIONAL LIGNIN, AND ITS USE IN PRODUCING BLENDS, COPOLYMERS, AND SELF-HEALING ELASTOMERS

CROSS-REFERENCE TO RELATED APPLICATIONS

The present application claims benefit of U.S. Provisional Application No. 62/631,534 filed Feb. 16, 2018, all of the contents of which are incorporated herein by reference.

STATEMENT REGARDING FEDERALLY SPONSORED RESEARCH

This invention was made with government support under Prime Contract No. DE-AC05-00OR22725 awarded by the U.S. Department of Energy. The government has certain rights in the invention.

FIELD OF THE INVENTION

The present invention generally relates to lignin compositions and their use in producing lignin-based plastics, rubbers, and composites. The present invention is more particularly directed to functionally enriched lignin obtained either as extracts of lignin or chemically modified lignin and their use for producing polymeric materials in which lignin is incorporated.

BACKGROUND OF THE INVENTION

Lignin, a complex O-methyl-substituted polyphenol found in lignocellulosic biomass, is the third most abundant natural polymer (after cellulose and chitin, respectively) that accounts for up to 30% by weight of wood. Lignin is a valuable by-product of the pulp and paper industry produced in quantities exceeding 200 million metric tons annually, but the vast majority of this by-product (>99%) is not isolated but combusted in the form of "black liquor" to meet the energy needs of the mill. Future and upcoming biorefineries that process lignocellulosic materials for the production of fuel and commodity products (e.g., ethanol or liquid alkanes) are also expected to produce lignin in large amounts as a byproduct.

Significant commercial potential exists in the conversion of lignin to high-value end products (i.e., functional materials), but lignin remains a highly difficult and challenging material to convert into such useful products. Although functional plastic materials have been produced from lignin, these materials are generally highly-crosslinked thermosets, which are not melt-processable (and hence, not recyclable). Furthermore, due to their rigid and brittle character, the known lignin-containing plastics generally lack the rubber elasticity, strength, and toughness required for use in many industrial and commercial applications (e.g., automobile interior or exterior materials). Moreover, the known lignin-containing plastics are generally not amenable for being adjusted or fine-tuned in such characteristics as glass transition temperature ($T_g$), degree of stiffness (i.e., rigidity), ductility, tensile failure strength, and toughness, thereby significantly limiting their range of applications. In addition to the above issues, conventional lignin-based polymers generally possess a lignin phase that is not homogeneously dispersed, which results in poor mechanical properties and higher risk of failure (Tran et al., *Advanced Functional Materials*, 26(16), 2677-2685, 2016).

There is also a need in the art to produce a range of polymers having self-healing properties. Many self-healing materials rely on supramolecular interactions, such as hydrogen-bonding, π-π stacking, metal-ligand interactions, and ionic interactions. These weak interactions afford quick and spontaneous self-healing but also lead to unsatisfactory mechanical properties. One solution to this problem is to introduce multiple phases into the material, i.e., a hard phase that confers stiffness and a soft phase that confers self-healing. By virtue of its rigid structure, lignin has a high theoretical Young's modulus of 2.31~4.65 GPa (T. Elder, *Biomacromolecules*, 8, 3619-3627, 2007), making it potentially useful as the hard segment in a self-healing polymer. However, use of lignin to make a self-healing material has not yet been realized due to lignin's complex structure, high crosslinking density, and variable mixture of molecules. Thus, there would be a significant benefit in a new process in which lignin can be successfully used to make a variety of polymers, particularly those with self-healing properties, and which overcomes the inherent and persistent limitations of lignin for this purpose.

SUMMARY OF THE INVENTION

In a first aspect, the instant disclosure is directed to a unique lignin substance obtained by extracting a lignin source with a nitrile solvent. The extracted lignin substance is unique in the sense that it possesses special properties that make it particularly suited for incorporation as a hard segment in a copolymeric composition. The lignin extract confers the copolymeric composition with self-healing properties along with exceptional strength and toughness. The extracted lignin possesses these improved properties at least in part by virtue of its much greater uniformity in structure and composition along with greater carboxylic acid content and lower methoxy group content compared to the source lignin. More specifically, the extracted lignin has herein been found to contain molecules possessing 5-15 (or more particularly, 8-12) phenyl rings interconnected by ether and alkylene linkages and containing hydroxy and/or methoxy groups attached to the phenyl rings. The extracted lignin also exhibits a glass transition temperature range having a median temperature within 80-100° C. and lower and upper temperature bounds of ±5° C., ±4° C., ±3° C., ±2° C., ±1.5° C., or ±1° C. from the median temperature (e.g., a median temperature of 96.5 and ±1.5° C. from the median temperature, which corresponds to a glass transition temperature range of 95-98° C.). The extracted lignin also exhibits an average degree of substitution (DS) of carboxylic acid groups per phenyl ring of at least 0.5 and a DS of methoxy groups per phenyl ring of no more than 1.2, 1.1, or 1.0. At least 90 wt % of the lignin compounds in the extract has a molecular weight within a range of 1500-3000 g/mol or 2000-2500 g/mol and/or wherein the molecular weight distribution of the lignin compounds is characterized by a polydispersity index of 1.0-1.5, 1.0-1.4, or 1.0-1.3. Notably, the extracted lignin described above includes only lignin compounds having the above characteristics. Conversely, the extracted lignin does not include other lignin compounds that do not possess the above characteristics.

In a second aspect, the present disclosure is directed to a chemically modified lignin substance in which the lignin has been functionalized with a greater density of carboxylic acid groups. The chemically modified lignin contains molecules possessing 5-30 phenyl rings interconnected by ether and alkylene linkages and containing hydroxy and/or methoxy groups attached to the phenyl rings. The modified lignin may also exhibit a glass transition temperature of 80-100° C. and an average degree of substitution (DS) of carboxylic acid groups per phenyl ring of at least 0.5 and a DS of methoxy groups per phenyl ring of no more than 1.2, 1.1, or 1.0. At least 90 wt % of the lignin compounds in the modified lignin has a molecular weight within a range of 500-5000 g/mol and/or wherein the molecular weight distribution of the lignin compounds is characterized by a polydispersity index of 1.0-1.5, 1.0-1.4, or 1.0-1.3. In some embodiments, the chemically modified lignin has any one or more of the characteristics described above for the lignin extract, e.g., in number of phenyl rings, glass transition temperature, average degree of substitution of carboxylic acid and/or methoxy groups, molecular weight, and polydispersity index.

In a third aspect, the present disclosure is directed to a method of making the lignin extract described above from a lignin source. The lignin source can be any lignin-containing material, such as Kraft lignin, sulfite lignin (i.e., lignosulfonate), or a sulfur-free lignin, and wherein the lignin may be derived from any lignocellulosic source, such as hardwood, softwood, grasses, shells, husks, or hulls. The lignin may also be from a biorefinery waste stream. The method generally involves (i) mixing the lignin source in a nitrile solvent (e.g., acetonitrile or propionitrile) until soluble lignin compounds dissolve into the nitrile solvent and insoluble lignin compounds remain undissolved; and (ii) isolating the soluble lignin compounds by removing the insoluble lignin compounds. In some embodiments, the process further includes substantially or completely removing the nitrile solvent from the lignin extract.

In a fourth aspect, the present disclosure is directed to a method of making a modified lignin containing a higher carboxylic acid content, as described above. In some embodiments, chemical modification of unextracted lignin oligomer is used to obtain this unique lignin substance. The method generally includes: (1) dissolving lignin in a suitable solvent (e.g., dimethyl sulfoxide (DMSO), tetrahydrofuran (THF) or acetone), and (2) reacting the dissolved lignin with a reactive modifier that functionalizes the lignin with additional carboxylic acid groups. In some embodiments, the reactive modifier contains a reactive functional group and a carboxylic acid group, or the reactive modified may be an anhydride of a dicarboxylic acid. Typically, the reactive functional group reacts with alcohol groups in the lignin. After modification, the modified lignin substance may possess the same or similar characteristics as the lignin extract described above.

In a fifth aspect, the present disclosure is directed to a self-healing polymer elastomer that contains the above-described lignin extract copolymerized with a flexible soft segment, such as polyethylene glycol (PEG). The result is a self-healing polymer containing both hard lignin segments and soft PEG segments. The lignin compounds in the self-healing polymer are preferably present in an amount of 20-80 wt % or 40-60 wt % by weight of the self-healing elastomer. The PEG segments may have a number-average molecular weight of, for example, 2000-10,000 g/mol, 200-5000 g/mol, or 200-2500 g/mol. The self-healing elastomer is homogeneous in nature and preferably does not contain phase-separated domains above 10 nm in size. The lignin-PEG copolymers described herein are characterized by significant strength and toughness, while at the same time having a sufficient degree of self-healing ability, strength, and toughness to make them useful in a number of different applications. In some embodiments, the self-healing elastomer may have an elastic modulus of at least 30 MPa and a tensile stress of at least 3 MPa.

In a sixth aspect, the present disclosure is directed to a method for producing the self-healing elastomer described above. The method includes reacting the lignin extract compounds described above with PEG molecules functionalized with reactive groups that form covalent bonds with the lignin compounds. The reactive groups on the PEG may be, for example, epoxy, ester, or acyl chloride groups. In some embodiments, the PEG compounds are terminated on each end with glycidyl ether or active ester groups.

Moreover, by the method described herein for their manufacture, a variety of lignin-PEG copolymers differing in mechanical properties can be produced. Thus, a particularly advantageous aspect of the method is the ability to adjust a variety of characteristics of the copolymer by appropriate selection of conditions in the process. Some of the conditions that can be selected to adjust the properties of the copolymer include the weight (or length) and composition of the PEG component, the molar or weight ratio between the lignin and PEG components, and the temperature and reaction time during which the lignin and PEG are reacted.

In a seventh aspect, the present disclosure is directed to tough thermoplastics that contain the above-described lignin extract or modified lignin molecularly interacting with a nitrile-containing polymer (e.g., nitrile rubber) or a polyamide (e.g., a nylon). The resulting thermoplastic contains 30 wt %~60 wt % of lignin inside. The thermoplastics are characterized by significant strength and toughness. In some embodiments, the thermoplastics may have a tensile failure stress of at least 30, 40, or 50 MPa and strain at break of at least 100%. In specific embodiments, the thermoplastic possesses a tensile failure stress of at least 30, 40, or 50 MPa and strain at break of at least 200%, 300%, or 400%.

BRIEF DESCRIPTION OF THE FIGURES

FIG. 1A shows $^{13}$C-NMR spectra of extracted lignin ("ACN-lignin") (top) vs. as-received lignin (bottom) in $d^6$-DMSO. FIG. 1B structurally depicts the average degree of substitution (DS) of each functional group per aromatic unit in ACN-lignin (top) vs. as-received lignin (bottom). FIG. 1C shows Fourier-transform infrared (FTIR) spectra of the ACN-lignin (bottom curve) vs. as-received lignin (top curve). Notably, the curves show different peak intensities in the C=O stretching band and hydrogen bonding band. FIG. 1D shows differential scanning calorimetry (DSC) thermograms of the ACN-lignin (bottom curve) vs. as-received lignin (top curve). Notably, the ACN-lignin shows a glass transition behavior whereas the as-received lignin does not. FIG. 1E shows thermogravimetric analysis (TGA) curves of the two lignin samples. Notably, the ACN-lignin shows a higher thermal decomposition temperature and a steeper weight loss curve upon degradation.

DETAILED DESCRIPTION OF THE INVENTION

Figure 5:
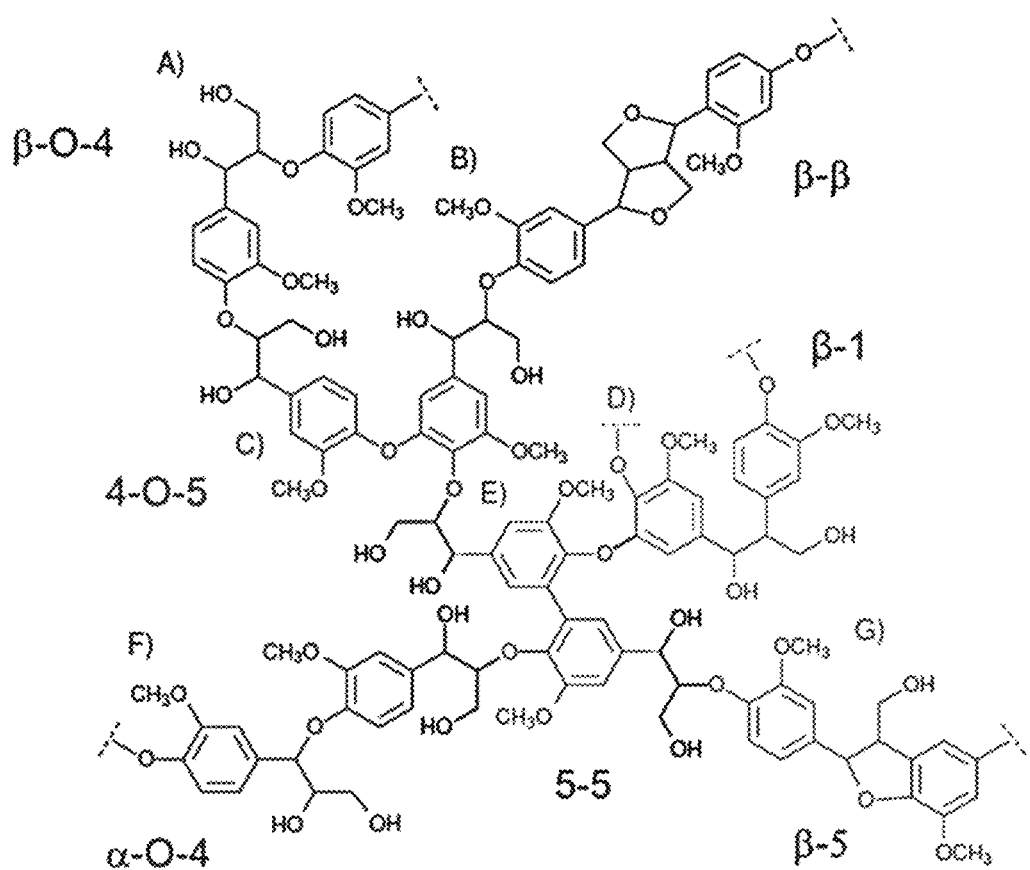
FIG. 5 is an exemplary lignin structure of the art.

In a first aspect, the invention is directed to a lignin composition obtained by extracting a lignin source with a nitrile solvent. The compounds in the extracted lignin typically possess 5-15 phenyl rings, or a sub-range therein, such as 5-12, 5-10, 5-8, 8-15, 8-12, 10-15, or 12-15 phenyl rings interconnected by the typical linking groups known to be in lignin, e.g., independently selected from one or more of ether (—O—) and alkylene linkages (e.g., —CH$_2$—, —CH$_2$CH$_2$—, —CH$_2$CH$_2$CH$_2$—, or —CH$_2$CH(CH$_3$)—) and wherein hydroxy and/or methoxy groups are attached to the phenyl rings. The alkylene linkages can be linear or branched, but typically, at least a portion of the alkylene linkages are branched. Typically, the phenyl rings are interconnected by linkages containing both ether and alkylene portions, e.g., —OCH(R)—, —OCH(R)CH(R)—, OCH(R) CH(R)CH(R)—, —OCH(CH$_2$OH)—, or —OCH(OH)CH (CH$_2$OH)—, where R can be, for example, H, OH, CH$_2$OH, or —O—. Thus, at least a portion of the linkages connecting phenyl rings are also typically substituted with hydroxy groups. An exemplary lignin structure of the art is shown in FIG. 5. As shown in FIG. 5, the lignin structure typically includes ether (—O—) linkages (e.g., β-O-4 link marked as link A, 4-O-5 link marked as link C, and α-O-4 link marked as link F) and C—C covalent linkages (e.g., β-β link marked as link B, β-1 link marked as link D, 5-5 link marked as link E, and β-5 link marked as link G). Some of these C—C covalent linkages can be alkylene linkages as mentioned earlier and wherein hydroxy and/or methoxy groups are attached to the phenyl rings.

The lignin extract composition generally possesses a glass transition temperature range having a median temperature within 80-100° C. and lower and upper temperature bounds of ±5° C., ±4.5° C., ±4° C., ±3.5° C., ±3° C., ±2.5° C., 2° C., ±1.5° C., or ±1° C. from the median temperature. The median temperature may be, for example, 80, 82.5, 85, 86, 87.5, 88, 90, 92.5, 95, 96, 96.5, 97, 97.5, 98, 98.5, 99, 99.5, or 100° C., or within a range bounded by any two of the foregoing values. As an example, the glass transition temperature range may have a median temperature of 95° C., with ±5° C. from the median temperature, which corresponds to a glass transition temperature range of 90-100° C. As another example, the glass transition temperature range may have a median temperature of 88.5° C., with ±2.5° C. from the median temperature, which corresponds to a glass transition temperature range of 86-91° C. In particular embodiments, the lignin composition possesses a glass transition temperature of, for example, 95-98° C., 95-97° C., or 96-98° C. The lignin composition also possesses a degree of substitution (DS) of carboxylic acid groups per phenyl ring of at least or above 0.5, 0.55 0.6, 0.65, 0.7, 0.75, or 0.8 (or range therein) and a DS of methoxy groups per phenyl ring of no more than or less than 1.2, 1.1, 1.0, 0.95 0.9, 0.85, 0.8, 0.7, 0.6, 0.5, 0.4, 0.3, or 0.2 (or range therein). At least 90, 92, 95, 98, or 99 wt % (or all, i.e., 100%) of the lignin compounds in the extract has a molecular weight within a range of 1500-3000 g/mol or 2000-2500 g/mol. Moreover, the molecular weight distribution of the lignin compounds is characterized by a polydispersity index of 1.0-1.5, 1.0-1.4, or 1.0-1.3. In some embodiments, the polydispersity index is 1.0-1.25, or 1.0-1.2, or 1.0-1.15, or 1.0-1.1. Notably, the above physical features and properties of the lignin composition are inclusive of all lignin compounds in the extract, i.e., lignin compounds not possessing the above characteristics are not present in the lignin composition, except where expressly permitted (i.e., up to or less than 10 wt % of lignin compounds having a molecular weight outside of the range of 2000-2500 g/mol). Moreover, in some embodiments, the above-described lignin extract includes a nitrile solvent (e.g., acetonitrile or propionitrile, or as further discussed below) in a trace amount (e.g., 0.1-1 wt %) or in a more substantial amount (e.g., at least 1, 2, 3, 4, 5, 10, 15, or 20 wt %) or within a range therein.

In another aspect, the present disclosure is directed to a method for producing the lignin extract composition described above. In the method, a lignin source is mixed with a nitrile solvent until soluble lignin compounds dissolve into the nitrile solvent and insoluble lignin compounds remain undissolved. The lignin source is intimately and thoroughly mixed with the nitrile solvent by any of the mixing or blending methods known in the art. The nitrile solvent is any organic solvent containing at least one nitrile group. The term "solvent," as used herein, generally refers to a substance having a melting point of no more than or less than 40° C., and more typically, no more than or less than 30, 25, 20, 15, 10, or 0° C. Some examples of nitrile solvents include acetonitrile, propionitrile, butyronitrile, isobutyronitrile, valeronitrile, pivalonitrile, malononitrile, benzonitrile, benzyl cyanide, and 3-hydroxypropanenitrile. In some embodiments, the solvent is not internally charged, such as in an ionic liquid. Thus, in some embodiments, ionic liquids are excluded as solvents. In some embodiments, the mixing process is conducted at room temperature (typically, 18-30° C., or approximately 20° C. or 25° C.). In other embodiments, the solvent in admixture with lignin is heated to a temperature above room temperature during the mixing process, provided that the temperature is not more than or is below 50° C., 100° C., or 150° C., or the temperature is below the boiling point of the nitrile solvent and less than the decomposition temperature ($T_d$) of the lignin, where $T_d$ can be, for example, about 240° C., 230° C., 240° C., 230° C., 220° C., 210° C., or 200° C. The insoluble lignin compounds can be removed by any suitable method known in the art, such as by centrifugation, filtration, or gravimetric settling followed by decanting. In some embodiments, the extraction method includes a further step of removing the solvent. The solvent removal can be achieved by any of the methods known in the art, such as by rotary evaporation or air (or inert gas) drying.

The lignin source can be any of the wide variety of lignin compositions found in nature in lignocellulosic biomass and as known in the art. As known in the art, the lignin compositions found in nature are generally not uniform. Lignin is a random copolymer that shows significant compositional variation between plant species. Many other conditions, such as environmental conditions, age, and method of processing, influence the lignin composition. Lignins are very rich aromatic compounds containing many hydroxyl (also possible carboxylic) functional groups attached differently in both aliphatic and phenolic groups. Additionally, lignins possess highly-branched structures. These characteristics of lignins determine their corresponding physical properties. The molar mass or molecular weight ($M_w$) of the source lignin is generally broadly distributed, e.g., from approximately 1000 Dalton (D) to over 10,000 D. In typical embodiments, the source lignin may have a number-average or weight-average molecular weight (i.e., $M_n$ or $M_w$, respectively) of about, up to, or less than, for example, 300, 500, 1,000, 3,000, 5,000, 8,000, 10,000, 50,000, 100,000, 500,000 or 1,000,000 g/mol, [G. Fredheim, et al., *J. Chromatogr. A*, 2002, 942, 191; and A. Tolbert, et al., *Biofuels, Bioproducts & Biorefining* 8(6) 836-856 (2014)] wherein the term "about" generally indicates no more than ±10%, ±5%, or ±1% from an indicated value. In some embodiments, the lignin is significantly deploymerized when isolated from native biomass source and has a molar mass of less than 1000 D. Their natural branches and low $M_w$ result in very brittle characteristics. The aromatic structures and rich functional groups of lignins also lead to varied rigid and thermal properties. Lignins are amorphous polymers, which results in very broad glass transition temperatures ($T_g$), from ca. 80° C. to over 200° C. The glass transition temperatures are critical temperatures at which the lignin macromolecular chains start moving and rotating. Some lignins exhibit a very good flow property (low molten viscosity), whereas others display several orders of magnitude higher viscosity.

Lignins differ mainly in the ratio of three alcohol units, i.e., p-coumaryl alcohol, guaiacyl alcohol, and sinapyl alcohol. The polymerization of p-coumaryl alcohol, coniferyl alcohol, and sinapyl alcohol forms the p-hydroxyphenyl (H), guaiacyl (G) and syringyl (S) components of the lignin polymer, respectively. The precursor (source) lignin can have any of a wide variety of relative weight percents (wt %) of H, G, and S components. As observed in some seeds, lignin may also consist of caffeyl alcohol units, e.g., Chen et al. *PNAS*, 109(5), 1772-1777 (2012). For example, the precursor lignin may contain, independently for each component, at least, up to, or less than 1 wt %, 2 wt %, 5 wt %, 10 wt %, 20 wt %, 30 wt %, 40 wt %, 50 wt %, 60 wt %, 70 wt %, 80 wt %, or 90 wt %, or within a range thereof, of any of the caffeyl alcohol, H, G, and S components. Typically, the sum of the wt % of each alcohol component is 100%, or at least 98% if other minor components are considered. Different wood and plant sources (e.g., hardwood (HW), such as oak, maple, poplar, and the like; softwood (SW), such as pine, spruce, and the like; or grass-derived lignins, such as switchgrass, corn, bamboo, perennial grass, orchard grass, alfalfa, wheat, miscanthus, bamboo, and bagasse) often widely differ in their lignin compositions, and are all considered herein as sources of lignin. In some embodiments, depending on the desired characteristics of the lignin-PEG copolymer, any one or more types of lignin, as described above, may be excluded from the polymer blend material.

Besides the natural variation of lignins, there can be further compositional variation based on the manner in which the source lignin has been processed. For example, the source lignin can be a Kraft lignin, sulfite lignin (i.e., lignosulfonate), or a sulfur-free lignin. As known in the art, a Kraft lignin refers to lignin that results from the Kraft process. In the Kraft process, a combination of aqueous sodium hydroxide and sodium sulfide (known as "white liquor") is reacted with lignin present in biomass to form a dark-colored lignin bearing thiol groups. Kraft lignins are generally water- and solvent-insoluble materials with a high concentration of phenolic groups. They can typically be made soluble in aqueous alkaline solution. As also known in the art, sulfite lignin refers to lignin that results from the sulfite process. In the sulfite process, sulfite or bisulfite (depending on pH), along with a counterion, is reacted with lignin to form a lignin bearing sulfonate ($SO_3H$) groups. The sulfonate groups impart a substantial degree of water-solubility to the sulfite lignin.

There are several types of sulfur-free lignins known in the art, including lignin obtained from biomass conversion technologies (such as those used in ethanol production), solvent pulping (i.e., the "organosolv" process), and soda pulping. In particular, organosolv lignins are obtained by solvent extraction from a lignocellulosic source, such as chipped wood, followed by precipitation. The solvent system in organosolv delignification of biomass often include organic alcohols, such as methanol, ethanol, propanol, butanol, and isobutyl alcohol; aromatic alcohols, such as phenol and benzyl alcohol; glycols, such as ethylene glycol, triethylene glycol, propylene glycol, butylene glycol and other higher glycols; ketones, such as acetone, methyl ethyl ketone and methyl isobutyl ketone; organic acids, such as formic acid, acetic acid and propionic acid, amines, esters, diethyl ether, dioxane, glycerol, or mixture of these solvents. Generally, a nitrile solvent is not used in methods of the art for delignification of a lignocellulosic source to extract lignin therefrom. This is likely due to the very low solubility of lignin in acetonitrile [C. Schuerch, *Journal of the American Chemical Society* 74.20 (1952): 5061-5067; R. D. Mortimer, *Journal of Wood Chemistry and Technology*, 2:4, 383-415 (1982)]. Although softwood biomasses are difficult to delignify by this method some degree of dilute acid pretreatment of biomass helps delignification process. Due to the significantly milder conditions employed in producing organosolv lignins (i.e., in contrast to Kraft and sulfite processes), organosolv lignins are generally more pure, less degraded, and generally possess a narrower molecular weight distribution than Kraft and sulfite lignins. These lignins can also be thermally devotalized to produce a variant with less aliphatic hydroxyl groups, and molecularly restructured forms with an elevated softening point. Any one or more of the foregoing types of lignins may be used (or excluded) as a component in the method described herein for producing lignin-PEG copolymer.

In some embodiments, in the nitrile extraction process disclosed herein, an organosolv lignin from any of the biomass types described above, is further functionally enriched by extraction (fractionation) using a nitrile solvent, as described above. For example, a hardwood-based organosolv lignin generally has a lower molecular weight and a higher degree of functionality. Nevertheless, the functionally enriched lignin obtained by the nitrile extraction process described herein has a significantly higher degree of carboxylic acid groups compared to that of the organosolv and original (source) lignin.

The source lignin may also be an engineered form of lignin having a specific or optimized ratio of H, G, and S components. Lignin can be engineered by, for example, transgenic and recombinant DNA methods known in the art that cause a variation in the chemical structure in lignin and overall lignin content in biomass (e.g., F. Chen, et al., *Nature Biotechnology*, 25(7), pp. 759-761 (2007) and A. M. Anterola, et al., *Phytochemistry*, 61, pp. 221-294 (2002)). The engineering of lignin is particularly directed to altering the ratio of G and S components of lignin (D. Guo, et al., *The Plant Cell*, 13, pp. 73-88, (January 2001). In particular, wood pulping kinetic studies show that an increase in S/G ratio significantly enhances the rate of lignin removal (L. Li, et al., *Proceedings of The National Academy of Sciences of The United States of America*, 100 (8), pp. 4939-4944 (2003)). The S units become covalently connected with two lignol monomers; on the other hand, G units can connect to three other units. Thus, an increased G content (decreasing S/G ratio) generally produces a highly branched lignin structure with more C—C bonding. In contrast, increased S content generally results in more β-aryl ether (β-O-4) linkages, which easily cleave (as compared to C—C bond) during chemical delignification, e.g., as in the Kraft pulping process. It has been shown that decreasing lignin content and altering the S/G ratio improve bioconvertability and delignification. Thus, less harsh and damaging conditions can be used for delignification (i.e., as compared to current practice using strong acid or base), which would provide a more improved lignin better suited for higher value-added applications, including manufacturing of tough polymer blends, carbon materials production (e.g., carbon fiber, carbon powder, activated carbon, microporous and mesoporous carbon) and pyrolytic or catalytic production of aromatic hydrocarbon feedstock.

Lab-scale biomass fermentations that leave a high lignin content residue have been investigated (S. D. Brown, et al., *Applied Biochemistry and Biotechnology*, 137, pp. 663-674 (2007)). These residues contain lignin with varied molecular structure depending on the biomass source (e.g., wood species, grass, and straw). Production of value-added products from these high quality lignins would greatly improve the overall operating costs of a biorefinery. Various chemical routes have been proposed to obtain value-added products from lignin (J. E. Holladay, et al., Top Value-Added Chemicals from Biomass: Volume II—Results of Screening for Potential Candidates from Biorefinery Lignin, DOE Report, PNNL-16983 (October 2007)).

In another aspect, the invention is directed to a chemically modified lignin substance in which the lignin has been functionalized with a greater density of carboxylic acid groups compared to the source lignin. The chemically modified lignin can have any of the structural features found in the source lignin, except that the chemically modified lignin has a greater density of carboxylic acid groups. The chemically modified lignin may also have a lower density of methoxy groups. In particular embodiments, the chemically modified lignin contains molecules possessing 5-30 phenyl rings interconnected by ether and alkylene linkages and containing hydroxy and/or methoxy groups attached to the phenyl rings. The modified lignin may also exhibit a glass transition temperature of 80-100° C. and an average degree of substitution (DS) of carboxylic acid groups per phenyl ring of at least or above 0.5, 0.55 0.6, 0.65, 0.7, 0.75, or 0.8 (or range therein) and a DS of methoxy groups per phenyl ring of no more than or less than 1.2, 1.1, 1.0, 0.95 0.9, 0.85, 0.8, 0.7, 0.6, 0.5, 0.4, 0.3, or 0.2 (or range therein). In some embodiments, at least 90 wt % of the lignin compounds in the modified lignin has a molecular weight within a range of 500-5000 g/mol and/or wherein the molecular weight distribution of the lignin compounds is characterized by a polydispersity index of 1.0-1.5, 1.0-1.4, or 1.0-1.3. In some embodiments, the chemically modified lignin has any one or more of the characteristics described above for the lignin extract, e.g., in number of phenyl rings, glass transition temperature, glass transition temperature range, average degree of substitution of carboxylic acid and/or methoxy groups, molecular weight, and polydispersity index.

In another aspect, the invention is directed to a method of making the modified lignin containing a higher carboxylic acid content, as described above. The chemical modification is typically performed on an unextracted lignin oligomer, but the chemical modification may be performed on an extracted lignin, such as the nitrile-extracted lignin described above or on an organosolv lignin. The method generally includes: (1) dissolving lignin in a suitable solvent, such as a polar organic solvent, such as described above (e.g., DMSO, THF, or acetone), and (2) reacting the dissolved lignin with a reactive modifier that functionalizes the lignin with additional carboxylic acid groups. In some embodiments, the reactive modifier contains a reactive functional group and a carboxylic acid group, or the reactive modified may be an anhydride of a dicarboxylic acid. Typically, the reactive functional group reacts with alcohol groups in the lignin. The reactive modifier may be, for example, a chloroformate compound, e.g., Cl—C(O)OR, where R is a hydrocarbon group. The reaction between the chloroformate and hydroxy groups in the lignin results in formation of carbonate ester groups (i.e., —OC(O)OR) on the lignin, after which the ester groups can be hydrolyzed to carboxylic acid groups by means well known in the art. After modification, the modified lignin substance may possess one or more of the same or similar characteristics as the lignin extract described above, such as in the number of phenyl rings, glass transition temperature, average degree of substitution of carboxylic acid and/or methoxy groups, molecular weight, and polydispersity index.

Although not typical for purposes of the invention, the extracted or chemically modified lignin may be partially crosslinked after being extracted or chemically modified. The term "crosslinked" typically refers to the presence of additional methylene (i.e., —$CH_2$—) and/or ethylene (i.e., —$CH_2CH_2$—) linkages (i.e., linking groups) between phenyl ring carbon atoms in the lignin structure. In some embodiments, a mild polycondensation condition can be used, such as by formaldehyde crosslinking of phenols or self-condensation by reaction between carboxylic acid and aliphatic hydroxy groups in the presence of appropriate catalysts to yield branched segments from these functionally enriched oligomers.

The extraction or chemical modification process of lignin described above may also be integrated with a lignin-producing process. The lignin-producing process may be, for example, a pulp or paper manufacturing process, or a biorefinery process. Typically, biorefineries produce ethanol (as a product) and lignin (as a byproduct) from a lignocellulosic biomass source. Some examples of suitable lignocellulosic biomass materials include wood, corn stover, *Populus* (e.g., poplar, aspen, and/or cottonwood), switchgrass (i.e., *Panicum virgatum*), miscanthus, sugarcane, paper pulp, and hemp. In a biorefinery, biomass is generally initially pre-treated by boiling, steaming, and/or with dilute acid to loosen cellulose, hemicellulose, and other carbohydrate components in biomass from lignin. This pretreatment process is generally followed by saccharification (i.e., production of sugar, such as glucose, by use of a cellulase enzyme on cellulose), and then fermentation of the sugar by enzymes and/or an ethanologen microbe (e.g., yeast) to produce ethanol. Due to the relatively mild chemical process generally employed in a biomass-to-ethanol biorefinery, the lignin residue emanating from the biorefinery is generally less degraded and more conserved from its natural state, and generally has a higher molecular weight, than that isolated from conventional pulp processing operations, such as the Kraft pulping industry. By being "integrated", the equipment used in extracting or chemically modifying the lignin (by methods described above) is typically contained within or physically interconnected with the equipment used in the lignin-producing operation. For example, the lignin-producing operation may include a lignin precipitation or extraction vessel, from which lignin, after being obtained, is transferred by suitable mechanical means to a lignin extraction or chemical modification station in which the source lignin is extracted with a nitrile solvent and/or chemically modified.

In another aspect, the invention is directed to a process for producing lignin-PEG copolymers with self-healing properties, as briefly described above. In the method, the extracted or modified lignin, as described above, is reacted with polyethylene glycol (PEG) molecules that have been functionalized with lignin-reactive groups in order to form covalent bonds with the lignin compounds in the extracted or modified lignin. The result is typically a random branched copolymeric structure. The lignin compounds are generally present in the reaction process (and in the resulting copolymer product) in an amount of 20-80 wt % by weight of lignin and PEG compounds during the reaction (or by weight of the self-healing elastomer product). In different embodiments, the lignin compounds are present in the reaction process (and in the resulting copolymer product) in an amount of precisely or about 20, 25, 30, 35, 40, 45, 50, 55, 60, 65, 70, 75, or 80 wt % or in a amount within a range bounded by any two of the foregoing values (e.g., 40-60 wt %).

Generally, at least two lignin-reactive groups are present per each PEG molecule, typically on each terminal end of the PEG molecules. The lignin-reactive groups present on the PEG molecules permit the PEG molecules to covalently bind with the extracted or modified lignin compounds. The lignin-reactive groups can be any groups reactive to one or more types of groups that may be present in the extracted or modified lignin compounds. The reactive groups on the PEG molecules can be reactive to, for example, phenol hydroxy groups (as commonly found in lignin), alkylhydroxy groups, carboxylic acid groups, furanyl groups, aldehyde groups, or any other groups on the lignin, such as those that may be included by chemical modification. Some examples of lignin-reactive groups that can be on the PEG molecules include epoxy (e.g., glycidyl), carboxylic acid, carboxylic acid ester, acyl chloride, isocyanate, and amine groups. The extracted or modified lignin may also be suitably derivatized to include groups (e.g., any of the reactive groups described above, including amino or mercapto groups) reactive to groups on a modified or unmodified form of the PEG molecules.

Depending on the lignin functionalities present in the extract compound or its functionally modified or mildly crosslinked variants, the lignin content and/or the reactive PEG molecular weight can be selected to result in the lignin-PEG polymer system achieving a significantly networked structure. In a specific embodiment, a combination of reactive PEG molecular weights (e.g., about 500 g/mol and 2000 g/mol), at different volume fractions, are used to construct lignin-PEG randomly networked copolymers with variable lengths of soft segment (PEG) and a controllable degree of rubber elasticity in the system. Other PEG molecular weight combinations, such as two or more of any of the molecular weights provided earlier above, may be used.

A general schematic of the process for producing a lignin-PEG copolymer is provided as follows:

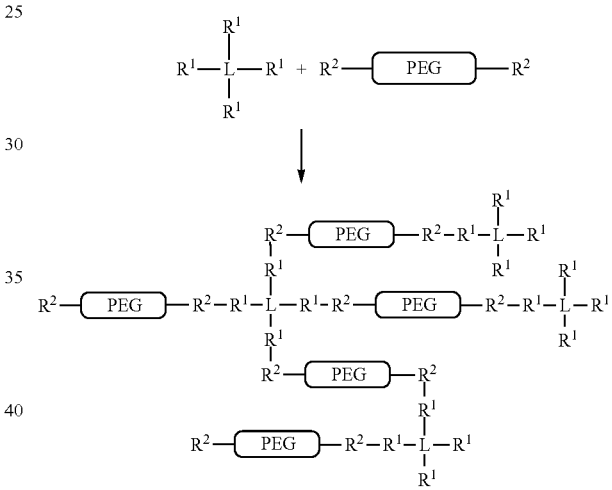

In the above schematic, the variable L represents a lignin compound from the lignin extract, "PEG" represents a PEG molecule, and the variables $R^1$ and $R^2$ represent reactive groups on the lignin compounds and PEG molecules, respectively. Although $R^1$ and $R^2$ are shown linked together, it is understood that, generally, a portion of $R^1$ and $R^2$ is either removed or modified during the reaction. Although the lignin compound (L) is depicted as having four reactive ($R^1$) groups, this is only exemplary; the lignin compounds generally possess a significantly greater number of reactive groups. Hence, each lignin compound should have significantly more attachment points for PEG molecules than depicted. Similarly, although the PEG molecules are depicted as having two (terminal) reactive groups ($R^2$), the PEG molecules may be functionalized with a greater number of reactive groups, and wherein the reactive groups may be at the terminal ends, or on interior units, or both. Moreover, the product depicted in the above scheme is intended as a representative portion of a much larger structure indefinitely expanded from lone $R^1$ and $R^2$ groups.

The conditions used for linking the lignin compounds with PEG molecules can include any of the conditions known in the art for facilitating a reaction between any of the common pairs of reactive groups described above. Some of the conditions generally well known in the art include those suitable for reaction between epoxy groups and hydroxy groups, esterification between carboxylic acid and alcohol groups, and reaction between isocyanate and alcohol groups to form carbamate groups. In some of the reactions, a catalytic species (such as an acid, base, or phosphine) and/or an elevated temperature are used to facilitate the reaction. In some embodiments, the lignin and/or PEG molecules are in a melted state when they are reacted together, provided that the temperature is less than the decomposition temperature ($T_d$) of the lignin, where $T_d$ is typically a temperature of about 240° C., 230° C., 240° C., 230° C., 220° C., 210° C., or 200° C. In some embodiments, during the reaction process, the lignin and PEG compounds are at a temperature of precisely or about 50° C., 75° C., 100° C., 125° C., 150° C., 175° C., or 200° C., or a temperature within a range bounded by any two of the foregoing temperatures, for sufficient time for copolymerization to take place. The lignin may or may not be admixed with a trace or substantial amount of a solvent to lower the glass transition temperature of the lignin during the reaction process.

The lignin-PEG copolymers produced by the above described process generally possess a uniform phase structure, i.e., with no discernible phase separation between lignin and PEG segments. In some embodiments, the uniform phase structure is evidenced in the lack of phase-separated domains. Instead of phase-separated domains, the lignin-PEG copolymer may be constructed of individual lignin and PEG molecules covalently bonded together to form a branched random network. If phase-separated domains are present, they generally do not have a size above 10 nm, 5 nm, 2 nm, or 1 nm. The uniform phase structure is believed to be at least partly responsible for the remarkable physical properties of the copolymer, e.g., an elastic modulus of at least 30, 40, 50, 60, 70, 80, 90, or 100 MPa and a tensile stress of at least or above 3, 5, 10, 15, 20, 25, 30, 40, or 50 MPa. The copolymer may also exhibit an elongation at break of 1%, 5%, 10%, 12%, 15%, 20%, 50%, or 100%, or an elongation within a range bounded by any two of the foregoing values.

In another aspect, the invention is directed to copolymers or solid polymer blend materials that include the above-described extracted or chemically modified lignin and an acrylonitrile-containing polymer component. The acrylonitrile-containing polymer component is generally thermoplastic or a melt-processable rubber. In some embodiments, the acrylonitrile-containing polymer contains functionalizing groups aside from nitrile groups, such as carboxy, hydroxy, ester, amino, or epoxy groups, which can serve to covalently bind with the lignin (for purposes of producing a lignin-acrylonitrile copolymer by methods analogous to those described above for producing the lignin-PEG copolymer). In other embodiments, particularly when applying the acrylonitrile-containing polymer as a blend with lignin, the acrylonitrile-containing polymer contains no such additional functionalizing groups. In particular embodiments, the acrylonitrile-containing polymer is elastomeric or a rubber, such as those polymers known in the art that include acrylonitrile units in combination with diene (e.g., butadiene) units. Generally, the acrylonitrile content is at least 20 mol %. In different embodiments, the acrylonitrile polymer (or more particularly, rubber) component has an acrylonitrile content of about, at least, or above 20, 25, 30, 33, 35, 38, 40, 42, 45, 48, 50, 52, or 55 mol %, or an acrylonitrile content within a range bounded by any two of the foregoing values. The acrylonitrile-containing rubber generally possesses the known or expected physical attributes of nitrile butadiene rubber materials of the art, such as a substantial extensibility, as generally evidenced in a typical ultimate elongation of at least 50%, 100%, 150%, 200%, 250%, 300%, 3500, 400%, 450%, or 500%.

In particular embodiments, an acrylonitrile-containing rubber constructed of (i.e., derived from) at least acrylonitrile units and diene monomer units is used as the acrylonitrile-containing polymer component. The term "diene," as used herein, refers to conjugated acyclic dienes, i.e., where the carbon-carbon double bonds are separated by a single carbon-carbon bond. In some embodiments, the diene possesses only carbon and hydrogen atoms, and optionally one or more halogen atoms. In other embodiments, the diene may include one or more functional groups that include oxygen and/or nitrogen atoms, such as those described in U.S. Pat. No. 6,583,260, which is herein incorporated by reference. Some examples of diene monomer units include, for example, butadiene (i.e., 1,3-butadiene), isoprene, chloroprene, 2-(cyanomethyl)-1,3-butadiene, and 2-(N,N-dimethylaminomethyl)-1,3-butadiene. The rubber is a copolymer containing acrylonitrile and diene segments. The term "copolymer," as used herein, indicates the presence of at least two types of polymer units, wherein the at least two types of polymer units are typically present in random form or as blocks (i.e., segments), but in some cases may be engaged in alternating, periodic, branched, or graft form.

In the case of the acrylonitrile rubber component containing only acrylonitrile and butadiene units, it may be more specifically referred to as a "nitrile butadiene rubber" or "NBR" component. In other embodiments, the acrylonitrile rubber component contains acrylonitrile and diene units along with one or more other units, such as one or more of styrene, divinyl benzene, acrylate and methacrylate units. In some embodiments, the acrylonitrile rubber component contains functionalizing groups aside from nitrile and unsaturated carbon-carbon bonds, such as carboxy, hydroxy, ester, amino, or epoxy groups, which can serve to covalently bind with the lignin. In other embodiments, one or all of such functionalizing groups are excluded from the acrylonitrile rubber component, in which case the acrylonitrile rubber does not covalently bind to the lignin but strongly interacts in blended form with the lignin via hydrogen bonds and/or physisorption. In some embodiments, any functionalizing groups capable of reacting with the lignin component (e.g., phenol- or hydroxy-reactive groups, such as epoxy or aldehyde groups) to form covalent bonds therewith are not present in the acrylonitrile rubber component. In some embodiments, the acrylonitrile rubber component contains only acrylonitrile and isoprene units, in which case it may be more specifically referred to as a "nitrile isoprene rubber" or "NIR" component.

The polymer blend material may further include a styrene-containing thermoplastic component. The styrene-containing thermoplastic is any polymer containing styrenyl units (i.e., from vinyl-addition polymerization) that behaves as a thermoplastic and is non-elastomeric. By being non-elastomeric, the styrene-containing thermoplastic has an elongation at break of less than 50%. Some examples of styrene-containing thermoplastics include acrylonitrile-butadiene-styrene (ABS), polystyrene (e.g., high impact polystyrene, also referred to as HIPS), styrene acrylonitrile copolymer, acrylate-styrene-acrylonitrile copolymer, styrene-methyl methacrylate copolymer, and styrene-maleic anhydride. The styrene-containing thermoplastic is typically present in an amount of 10-60 wt % by weight of the polymer blend material.

Polymer blends containing lignin and nitrile polymers can be produced by methods known in the art, such as described in U.S. Pat. No. 9,815,985, the contents of which are herein incorporated by reference in their entirety. Typically, the lignin and acrylonitrile components are melt-blended at a temperature below the decomposition temperature of the lignin, typically no more than 240° C. The terms "polymer blend" and "homogeneously dispersed," as used herein, refer to a solid solution in which discrete microscopic regions of components (i) and/or (ii) are present. The polymer blend may exhibit substantial integration (i.e., near homogeneous) at the microscale or approaching the molecular level, but without losing each component's identity. Generally, one of the components functions as a matrix in which domains (i.e., particles or microscopic regions) of the other component are dispersed. The domains generally have a size up to or less than 100 microns (100 μm). In different embodiments, the domains have a size up to or less than, for example, 50 μm, 10 μm, 5 μm (5000 nm), 2 μm (2000 nm), 1 μm (1000 nm), 800 nm, 500 nm, 200 nm, 100 nm, 50 nm, 25 nm, 10 nm, or 5 nm, or within a range bounded by any of these values. Any of the above exemplary domain sizes may alternatively represent a mean or median domain size, as found in a particle size distribution curve. For example, in some embodiments, at least 80%, 85%, 90%, or 95% of the domains have a size up to or less than any exemplary values provided above. In some embodiments, substantially all (e.g., above 95%) or all (i.e., 100%) of the domains have a size up to or less than any exemplary values provided above. The lignin-acrylonitrile copolymer or blend may have any of the physical attributes (e.g., elastic modulus), tensile stress, and elongation at break provided above for the lignin-PEG copolymers.

In another aspect, the invention is directed to copolymers or solid polymer blend materials that include the above-described extracted or chemically modified lignin and a polyamide. As described above for the nitrile polymers, the polyamide may or may include reactive groups capable of forming covalent bonds with the lignin. The polyamide may include such reactive groups for purposes of producing a lignin-polyamide copolymer by methods analogous to those described above for producing the lignin-PEG copolymer. Alternatively, the polyamide may not include such reactive groups when the purpose is to produce a lignin-polyamide blend. The term "polyamide," as used herein, refers to polymers having amide (—NH—CO—) linkages and a melting point of no more than 240° C. The polyamide is typically amorphous or semi-crystalline. The polyamide typically includes at least or greater than 10, 20, 30, 40, 50, 100, 150, 200, or 250 amide linkages (or alternatively, the same number of monomeric units). In some embodiments, the number of amide linkages are as high as 1000. In the case of a blend material, a polyamide is selected that has a melting point below the decomposition temperature of the lignin with which the polyamide is to be blended. In various embodiments, the polyamide has a melting point of precisely, about, up to, or less than, for example, 150° C., 160° C., 170° C., 180° C., 190° C., 200° C., 210° C., 215° C., 220° C., 225° C., 230° C., 235° C., or 240° C., or a melting point within a range bounded by any two of the foregoing values.

In some embodiments, the polyamide is an oligopeptide, such as polylysine, polyglutamic acid, polyglycine, polyalanine, polytyrosine, or polyglutamine. In other embodiments, the polyamide is a nylon, wherein the nylon can be conveniently expressed by the formula —[C(O)—R—C(O)—NH—R'—NH]n-, where R and R' are independently selected from linear, branched, cyclic, aliphatic, saturated, or unsaturated hydrocarbon linkages containing 1, 2, 3, 4, 5, 6, 7, 8, 9, 10, 11, or 12 carbon atoms (or a range of carbon atoms bounded by any of the foregoing exemplary values, independently for R and R'), and wherein n is typically at least 5, 10, 20, 50, 100, 500, or 1000. When R and R' are both aliphatic, the nylon is considered aliphatic. If either of R or R' is aromatic, the nylon is considered aromatic. In particular embodiments, R and R' are alkyl linkages, such as in nylon 6, nylon 11, and nylon 12. The foregoing nylons are well known in the art. For purposes of the invention, poly-paraphenylene terephthalamide (aramid) is not considered an acceptable polyamide since it has a melting point over 240° C. For the purpose of this invention, neat nylon 6,6 with a melting point of about 265° C. is not considered an acceptable polyamide, unless it is plasticized or modified with additives to result in a reduced melting point of less than 240° C. In some embodiments, the plasticizing additive can be an oligomeric polyamide with a few repeat units or a solvent that lowers the dimension of the crystalline phase in the semi-crystalline nylon 6,6 where imperfect crystals melt at lower temperature than that of the original matrix. In some embodiments, nylon 6,6 is modified with particulates that creates imperfect nylon 6,6 crystals with melting points of less than 240° C.

In the lignin-polyamide polymer blend material, the lignin component is typically present in an amount of at least 5 wt % and up to about 95 wt % by total weight of the lignin and polyamide components or by weight of the polymer blend material. As both lignin and polyamide components are present in the polymer blend, each component must be in an amount less than 100 wt %. In different embodiments, the lignin component is present in the polymer blend material in an amount of about, at least, or above, for example, 5, 10, 15, 20, 25, 30, 35, 40, 45, 50, 55, 60, 65, 70, 75, 80, 85, 90, or 95 wt %, or in an amount within a range bounded by any two of the foregoing exemplary values, e.g., at least 1, 5, or 10 wt % and up to 40, 45, 50, 55, 60, 65, 70, 75, or 80 wt % by total weight of lignin and polyamide components or by weight of the polymer blend material. The lignin-polyamide copolymer or blend may have any of the physical attributes (e.g., elastic modulus), tensile stress, and elongation at break provided above for the lignin-PEG copolymers.

The lignin-polyamide and lignin-acrylonitrile blends are typically produced by melting and blending of the components, as discussed in more detail below; thus, the process may be referred to as a "melt blending" process. The process for preparing the polymer blend material can employ any of the weight percentages (i.e., wt %) of components provided in the above earlier description of the polymer blend material. In the method, at least (or only) the lignin and polyamide (or lignin and acrylonitrile) components are mixed and homogeneously blended to form the polymer blend material. Any one of the components can be included in liquid form (if applicable), in solution form, or in particulate or granular form. In the case of particles, the particles may be, independently, nanoparticles (e.g., at least 1, 2, 5, or 10 nm, and up to 20, 50, 100, 200, or 500 nm), microparticles (e.g., at least 1, 2, 5, or 10 μm, and up to 20, 50, 100, 200, or 500 μm), or macroparticles (e.g., above 500 μm, or at least or up to 1, 2, 5, 25, 50, 100, 500, or 1000 mm). Typically, if a polymeric component is provided in particle or granular form, the particles are melted or softened by appropriate heating to permit homogeneous blending and uniform dispersion of the components. The temperature employed for melting the components should be below the decomposition temperature of the lignin, generally a temperature of no more than or less than 200° C., 210° C., 220° C., 230° C., or 240° C. The components can be homogeneously blended by any of the methodologies known in the art for achieving homogeneous blends of solid, semi-solid, gel, paste, or liquid mixtures. Some examples of applicable blending processes include simple or high speed melt mixing, compounding, extrusion, two-roll milling, or ball mixing, all of which are well-known in the art. In some embodiments, one or more of the components are in solid bale form and these are cut into useable chunks using standard bale cutting tools. The chunks of the components are typically mixed, melted, and blended (melt blended) in an internal mixer, such as a Banbury mixer. In other embodiments, one or more of the components are in sheet form and the components are mixed in a two-roll mill. In some embodiments, the polymer blend should exhibit a melt viscosity of no more than 500, 1000, 1500, or 2000 Pa·s at a shear rate of 100-1000 $s^{-1}$ when heated to a temperature of no more than 240° C.

Any of the polymer blend materials or copolymers described herein may or may not also include one or more additional components. If such additional component is included in a copolymer, the additional component is typically incorporated into the copolymer by blending the copolymer with the additional component. For example, in some embodiments, an agent that favorably modifies the physical properties (e.g., tensile strength, modulus, and/or elongation) may be included. Some of these modifying agents include, for example, carbon particles, metal particles, silicon-containing particles (e.g., silica or silicate particles), ether-containing polymers, Lewis acid compounds, solvents or plasticizers, and metal oxide compounds. In some embodiments, one or more such modifying agents are each independently, or in total, present in an amount of up to or less than 40, 30, 20, 15, 10, 5, 4, 3, 2, or 1 wt % by weight of the polymer blend material or copolymer, or one or more such components are excluded from the polymer blend material or copolymer.

The carbon particles, if present in the polymer blend material or copolymer, can be any of the carbon particles known in the art that are composed at least partly or completely of elemental carbon, and may be conductive, semiconductive, or non-conductive. The carbon particles may be nanoparticles (e.g., at least 1, 2, 5, or 10 nm, and up to 20, 50, 100, 200, or 500 nm), microparticles (e.g., at least 1, 2, 5, or 10 μm, and up to 20, 50, 100, 200, or 500 μm), or macroparticles (e.g., above 500 μm, or at least or up to 1, 2, 5, 10, 20, 50, or 100 mm). Some examples of carbon particles include carbon black ("CB"), carbon onion ("CO"), a spherical fullerene (e.g., buckminsterfullerene, i.e., $C_{60}$, as well as any of the smaller or larger buckyballs, such as $C_{20}$ or $C_{70}$), a tubular fullerene (e.g., single-walled, double-walled, or multi-walled carbon nanotubes), carbon nanodiamonds, carbon nanohorns, and carbon nanobuds, all of which have compositions and physical and electrical properties well-known in the art. As known in the art, fully graphitized carbon nanodiamonds can be considered to be carbon onions.

In some embodiments, the carbon particles are made exclusively of carbon, while in other embodiments, the carbon particles can include an amount of one or a combination of non-carbon non-hydrogen (i.e., hetero-dopant) elements, such as nitrogen, oxygen, sulfur, boron, silicon, phosphorus, or a metal, such as an alkali metal (e.g., lithium), alkaline earth metal, transition metal, main group metal (e.g., Al, Ga, or In), or rare earth metal. Some examples of binary carbon compositions include silicon carbide (SiC) and tungsten carbide (WC). The amount of hetero element can be a minor amount (e.g., up to 0.1, 0.5, 1, 2, or 5 wt % or mol %) or a more substantial amount (e.g., about, at least, or up to 10, 15, 20, 25, 30, 40, or 50 wt % or mol %). In some embodiments, any one or more of the specifically recited classes or specific types of carbon particles or any one or more of the specifically recited classes or specific types of hetero-dopant elements are excluded from the carbon particles.

In some embodiments, the carbon particles can be nanoscopic, microscopic, or macroscopic segments of any of the high strength continuous carbon fiber compositions known in the art. Some examples of carbon fiber compositions include those produced by the pyrolysis of polyacrylonitrile (PAN), viscose, rayon, pitch, lignin, and polyolefins, any of which may or may not be heteroatom-doped, such as with nitrogen, boron, oxygen, sulfur, or phosphorus. The carbon fiber may alternatively be vapor grown carbon nanofibers. The carbon particles may also be two-dimensional carbon materials, such as graphene, graphene oxide, or graphene nanoribbons, which may be derived from, for example, natural graphite, carbon fibers, carbon nanofibers, single walled carbon nanotubes and multi-walled carbon nanotubes. The carbon fiber typically possesses a high tensile strength, such as at least 500, 1000, 2000, 3000, 5000, 7,000, or 10,000 MPa, or higher, with a degree of stiffness generally of the order of steel or higher (e.g., 100-1000 GPa). In some embodiments, any one or more classes or specific types of the foregoing carbon particles are excluded from the polymer blend or copolymer.

An ether-containing polymer, if present in the polymer blend material or copolymer, can be, for example, a polyalkylene oxide (i.e., polyethylene glycol) or a copolymer thereof. Some examples of polyalkylene oxides include the polyethylene oxides, polypropylene oxides, polybutylene oxides, and copolymers thereof or with ethylene, propylene, or allyl glycidyl ether. The ether-containing polymer may also be, for example, a polyvinyl cyanoethyl ether, as described in, for example, U.S. Pat. No. 2,341,553, the contents of which are herein incorporated by reference. The ether-containing polymer may also be, for example, an etherified form of PVA, such as poly(vinyl methyl ether), which may correspond to CAS No. 9003-09-2. The ether-containing polymer may also be, for example, a phenyl ether polymer, which may be a polyphenyl ether (PPE) or polyphenylene oxide (PPO). The ether-containing polymer may also include cyclic ether groups, such as epoxide or glycidyl groups, or as further described in, for example, U.S. Pat. No. 4,260,702, the contents of which are herein incorporated by reference. The cyclic ether polymer may also be a cyclic anhydride modified polyvinyl acetal, as further described in U.S. Pat. No. 6,555,617, or a cyclic or spirocyclic polyacetal ether, as further described in, for example, A. G. Pemba, et al., *Polym. Chem.*, 5, 3214-3221 (2014), the contents of which are herein incorporated by reference. In yet other embodiments, the ether-containing polymer may be a cyclic or non-cyclic thioether-containing polymer, such as a polyphenyl thioether or polyphenylene sulfide. In some embodiments, any one or more classes or specific types of the foregoing ether-containing polymers are excluded from the polymer blend or copolymer.

Lewis acid compounds, if present in the polymer blend material or copolymer, can be any of the compounds known in the art having Lewis acid character, i.e., strongly electrophilic by virtue of a deficiency of electrons. Some examples of Lewis acid compounds include boron-containing compounds (e.g., boric acid, borates, borate esters, boranes, and boron halides, such as $BF_3$, $BCl_3$, and $BBr_3$), aluminum-containing compounds (e.g., aluminum hydroxide, aluminates, aluminate esters, and aluminum halides, such as $AlF_3$, $AlCl_3$, and $AlBr_3$), and tin-containing compounds, such as stannic acid, tin esters (e.g., tin(II) acetate or tin(II) 2-ethylhexanoate), tin alkoxides (e.g., tin(IV) ethoxide), and tin halides, such as $SnF_4$, $SnCl_4$, $SnBr_4$, and $SnI_4$. In some embodiments, any one or more classes or specific types of the foregoing Lewis acid compounds are excluded from the polymer blend or copolymer.

Metal oxide compounds, if present in the polymer blend material or copolymer, can have any metal oxide composition, typically particulate in form, that can function to improve a physical characteristic of the polymer blend material or copolymer. The metal of the metal oxide composition can be, for example, an alkali metal, alkaline earth metal, main group metal, transition metal, or lanthanide metal. Some examples of alkali metal oxides include $Li_2O$, $Na_2O$, $K_2O$, and $Rb_2O$. Some examples of alkaline earth metal oxide compositions include BeO, MgO, CaO, and SrO. Some examples of main group metal oxide compositions include $B_2O_3$, $Ga_2O_3$, SnO, $SnO_2$, PbO, $PbO_2$, $Sb_2O_3$, $Sb_2O_5$, and $Bi_2O_3$. Some examples of transition metal oxide compositions include $Sc_2O_3$, $TiO_2$, $Cr_2O_3$, $Fe_2O$, $Fe_3O_4$, FeO, $Co_2O_3$, $Ni_2O_3$, CuO, $Cu_2O$, ZnO, $Y_2O_3$, $ZrO_2$, $NbO_2$, $Nb_2O_5$, $RuO_2$, PdO, $Ag_2O$, CdO, $HfO_2$, $Ta_2O_5$, $WO_2$, and $PtO_2$. Some examples of lanthanide metal oxide compositions include $La_2O_3$, $Ce_2O_3$, and $CeO_2$. In some embodiments, any one or more classes or specific types of the foregoing metal oxides (or all metal oxides) are excluded from the polymer blend or copolymer.

Metal particles, if present in the polymer blend material or copolymer, may be included to modulate the electrical conductivity, thermal conductivity, strength, or magnetic properties of the produced object. The metal particles may be composed of or include, for example, iron, cobalt, nickel, copper, zinc, palladium, platinum, silver, gold, aluminum, silicon, or tin, or a combination thereof. The metal particles may include at least a portion of the metal in its elemental (zerovalent) state. The metal particles may alternatively have a metal carbide, metal nitride, or metal silicide composition. In some embodiments, any one or more classes or specific types of the foregoing metal particles (or all metal particles) are excluded from the polymer blend or copolymer.

A halogen-containing polymer, which may also function as a modifying agent, may or may not be present in the polymer blend material or copolymer. The halogen-containing polymer, if present in the polymer blend material or copolymer, can have the halogen atoms bound to aliphatic (i.e., non-aromatic, e.g., alkyl or alkenyl) or aromatic groups, as described above for a hydroxy-containing polymer. The halogen atoms can be, for example, fluorine, chlorine, and bromine atoms. Some examples of fluorinated polymers include poly(vinyl fluoride), poly(vinylidene fluoride), poly(tetrafluoroethylene), fluorinated ethylene-propylene copolymer, poly(ethylenetetrafluoroethylene), poly(perfluorosulfonic acid), and fluoroelastomers. Some examples of chlorinated polymers include poly(vinyl chloride), polyvinylidene chloride, ethylene-chlorotrifluoroethylene copolymer, polychloroprene, halogenated butyl rubbers, chlorinated polyethylene, chlorosulfonated polyethylene, chlorinated polypropylene, chlorinated ethylene-propylene copolymer, and chlorinated polyvinyl chloride. Some examples of brominated polymers include poly(vinyl bromide), and brominated flame retardants known in the art, such as brominated epoxy, poly(brominated acrylate), brominated polycarbonate, and brominated polyols.

In still other aspects, the invention is directed to articles made of any of the copolymeric materials or blends described above. The article is typically one in which a significant degree of strength and toughness is desired along with the ability to self-heal. In exemplary embodiments, the article forms a part of the interior of an automobile (e.g., seat or interior covering), the surface of a piece of furniture, a grip or handle portion of a tool or utensil, a physical barrier, weight-bearing structure, a mat, medical device, or surgical implant. In other embodiments, the lignin-PEG networked copolymer may be produced and applied as a coating or film, such as a protective film or a pressure sensitive adhesive. Numerous other articles may make use of the compositions described herein.

Examples have been set forth below for the purpose of illustration and to describe certain specific embodiments of the invention. However, the scope of this invention is not to be in any way limited by the examples set forth herein.

EXAMPLES

Lignin Extraction

A valuable lignin substance was obtained by solvent fractionation from as-received pine lignin that had been depolymerized by Kraft pulping followed by precipitation in an acidic medium. This fractionated substance maintains a rigid structure but also contains more reactive groups. As further discussed below, a primary benefit of this renewable material is its self-healing ability along with superior mechanical properties.

Specifically, 100 g of as-received Kraft softwood lignin was stirred in 700 mL of acetonitrile, and the mixture was centrifuged to separate and remove the insoluble material. The soluble lignin material (hereinafter also referred to as "ACN-lignin") was dried by a rotary evaporator until no solvent could be observed. The ACN-lignin was then further dried for another 1 hour. The yield of ACN-lignin was 13%.

Figure 1A:
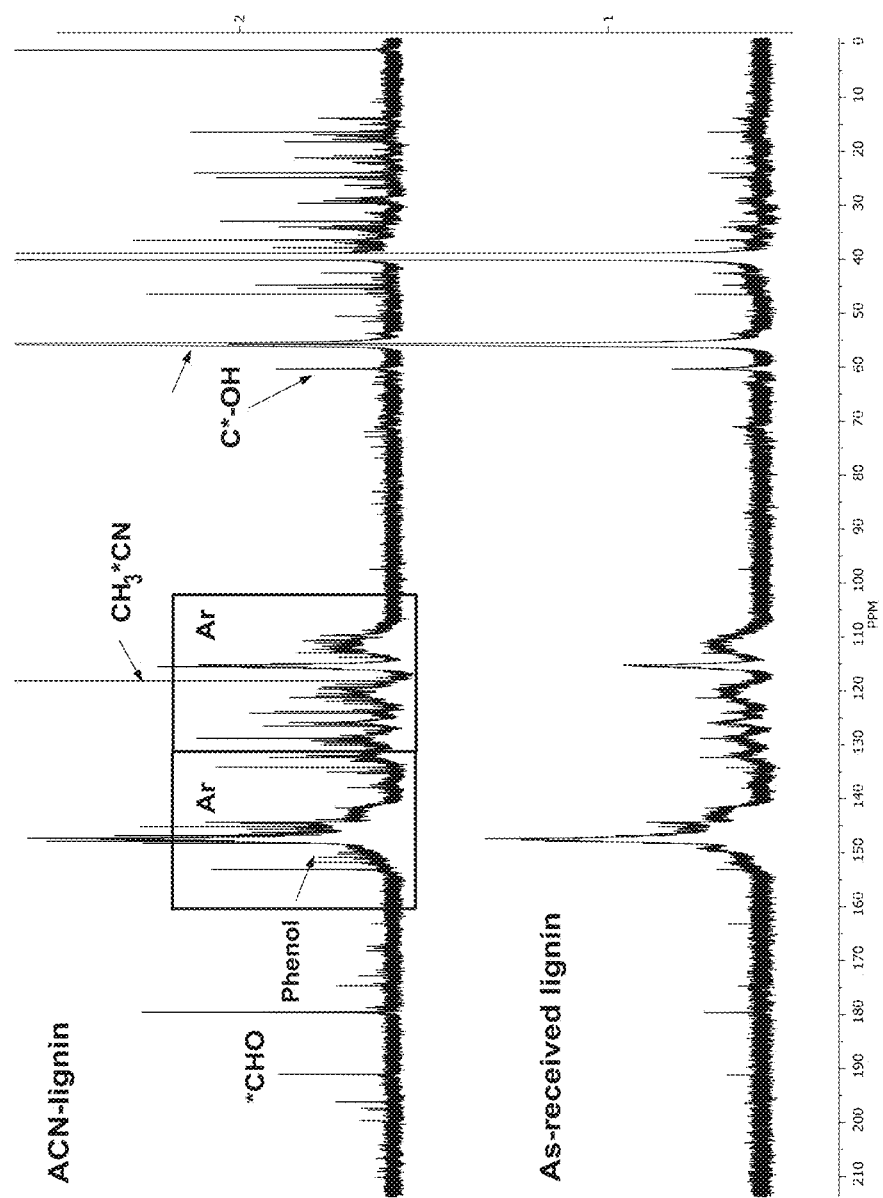
FIGS. 1A-1E show the chemical structures and characterization of as-received lignin and ACN-lignin.
Figure 1B:
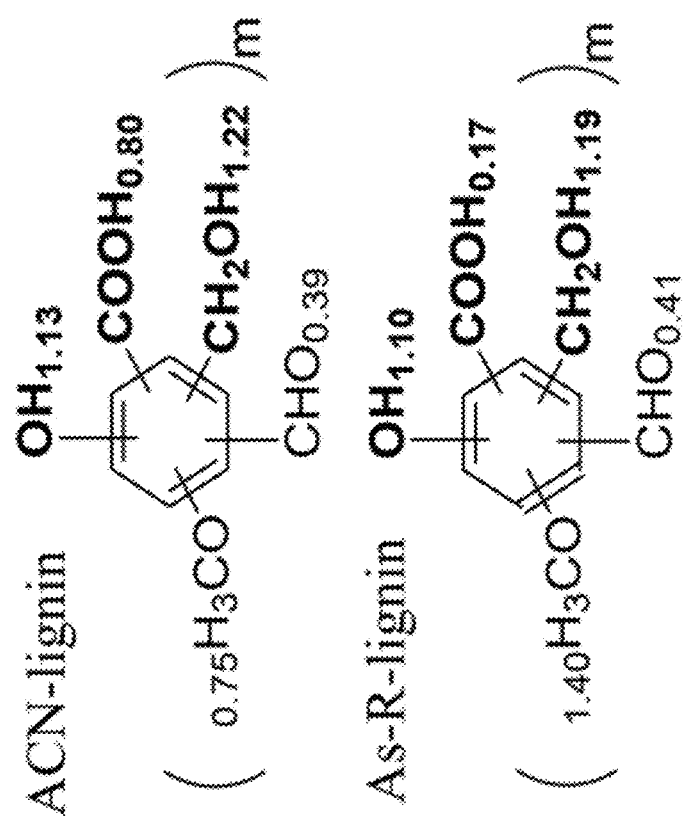
Figure 1C:
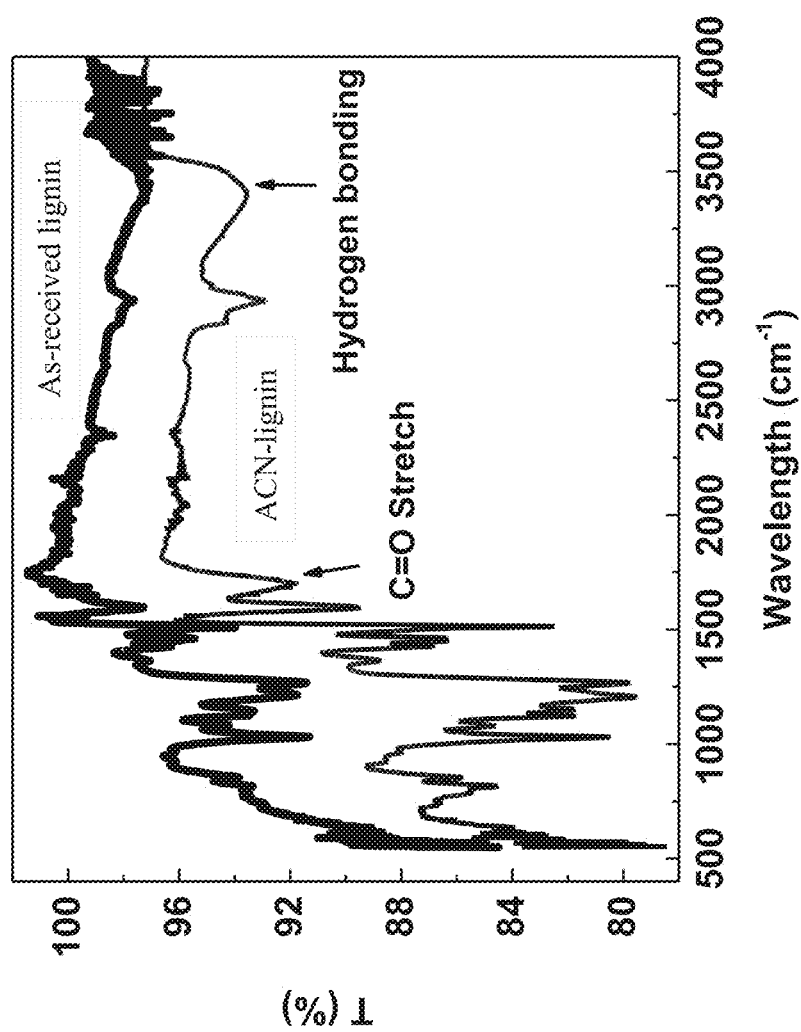

The composition of lignin before and after fractionation was characterized by nuclear magnetic resonance (NMR) techniques. FIG. 1A shows $^{13}$C-NMR spectra of as-received lignin and ACN-lignin in $d^6$-DMSO. From the NMR spectra, it can be deduced that both original and fractionated species consist of phenols substituted by alcohol, methoxy, aldehyde and carboxylic acid. The as-received lignin and the extracted lignin have an almost identical degree of substitution (DS) of alcohol and phenol (both around 1.20 per aromatic ring), and a similar DS of aldehyde (0.41 vs. 0.39). The major difference is in the DSs of carboxylic acid and methoxy groups. The as-received lignin contains 0.17 carboxylic acid and 1.40 methoxy per aromatic, whereas the extracted lignin has 0.80 carboxylic acid and 0.75 methoxy on average. FIG. 1B graphically depicts the average degree of substitution (DS) of each functional group per aromatic unit in the as-received lignin (bottom structure) vs. ACN-lignin (top structure). The extraction unexpectedly enriches the DS of carboxylic acid by five times and decreases the DS of methoxy by half. FIG. 1C is a Fourier-transform infrared (FTIR) spectrum showing different peak intensities in C=O stretching band and hydrogen bonding band between the as-received lignin (top spectrum) and ACN-lignin (bottom spectrum). The FTIR spectrum corroborates the NMR data by showing a more conspicuous C=O stretching peak at 1690 $cm^{-1}$ and a broad hydrogen-bonding peak from 3100 to 3550 $cm^{-1}$ in the ACN-lignin.

Figure 1D:
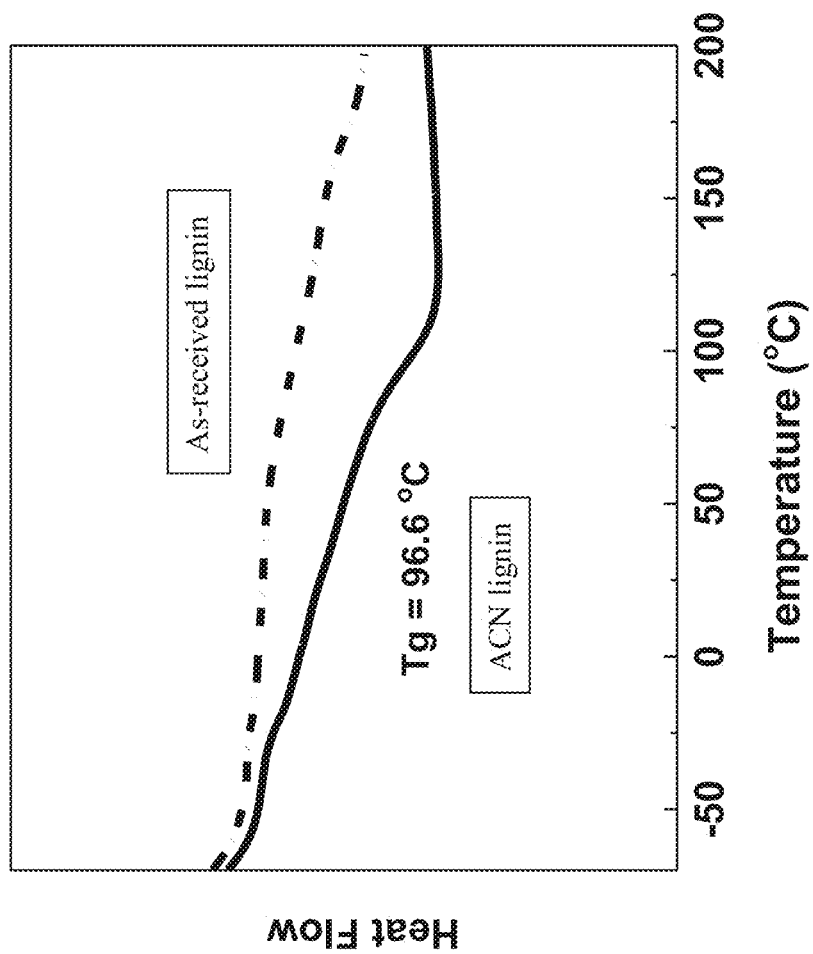
Figure 1E:
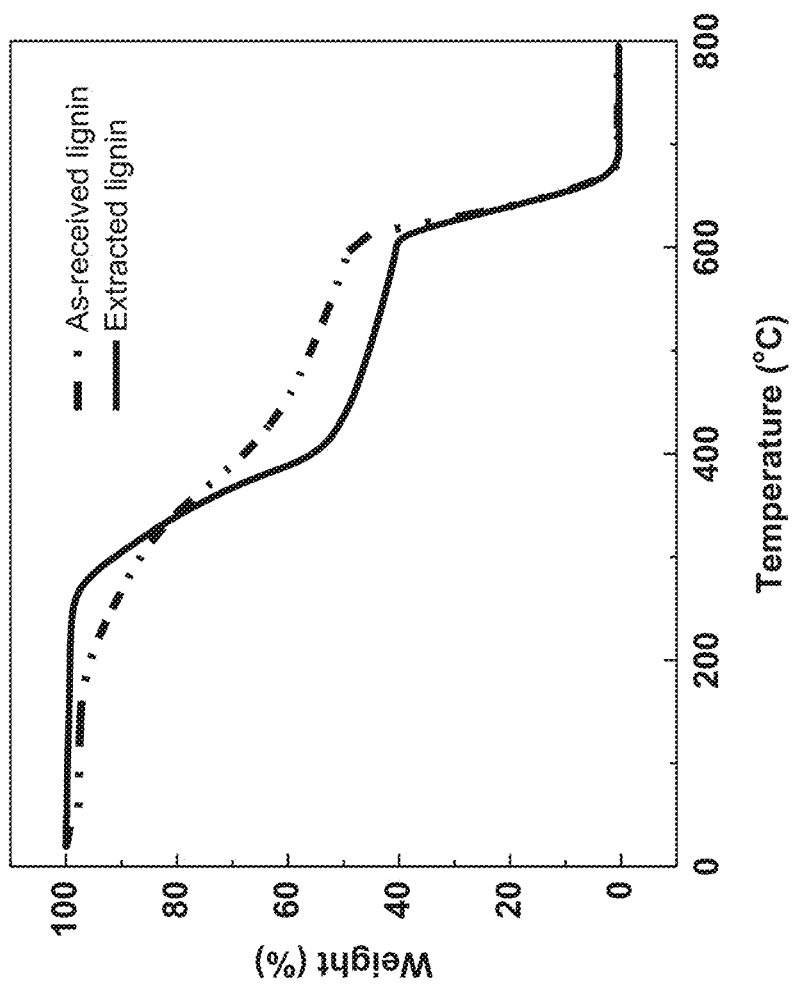

In addition to having a different chemical functionality, the extracted lignin contains more uniform species. With a polydispersity index reducing from 1.83 to 1.16, the molecular weight of the extracted lignin is more narrowly distributed around 2200 g/mol. As shown by the differential scanning calorimetry (DSC) thermograms in FIG. 1D, a glass transition temperature of 96.6° C. emerges for the extracted lignin, whereas the as-received lignin (dotted line in FIG. 1D) does not exhibit a detectable glass transition. As also shown by the thermogravimetric analysis (TGA) curves of the two lignin samples in FIG. 1E, by virtue of the greater uniformity in the extracted lignin, the thermal mass loss curve for the extracted lignin becomes steeper, accompanied by a slightly improved thermal stability up to 250° C. The above data reveals that the ACN-lignin is a rigid and uniform oligomer containing approximately ten aromatic repeating units substituted by carboxylic acid, alcohol, phenol, methoxy and aldehyde groups and featuring a significantly higher than normal DS of carboxylic acid. Compared with the as-received lignin, ACN-lignin is highly polar with significantly increased content of carboxylic acid and reduced methoxy groups. Functional enrichment makes the ACN-lignin more reactive for the preparation of functional copolymer materials. A summary of the comparative data obtained for ACN-lignin and as-received lignin is provided in Table 1 below.

TABLE 1

Comparison between ACN-lignin and as-received pine lignin samples in glass transition temperature ($T_g$), weight average molecular weight ($M_w$), polydispersity index (PDI), and number average degree of polymerization (m).

|  | $T_g$ (° C.) | MW (g/mol) | PDI | m |
| --- | --- | --- | --- | --- |
| ACN-lignin | 96.6 | ~2.0k | ~1.16 | ~10 |
| As-received lignin | — | ~3.4k | ~1.83 | ~17 |

Preparation of Lignin-PEG Self-Healing Elastomers

Figure 2A:
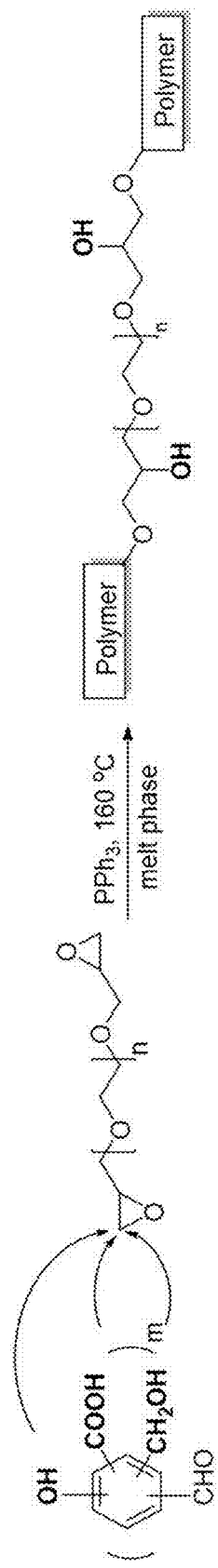
FIG. 2A is a general schematic of a process used for producing self-healing elastomers. In the process, diglycidyl ether-terminated polyethylene glycol (PEG) molecules are reacted with the ACN-lignin at melt phase.

Self-healing elastomers were prepared by reacting diglycidyl ether-terminated polyethylene glycol (PEG) with the ACN-lignin at melt phase. FIG. 2A is a general schematic of the reaction process. In FIG. 2A, the reaction pathway shows reaction of a carboxylic acid group and hydroxyl group on the lignin with an epoxy group on the PEG.

The elastomers were prepared, more specifically, by reacting poly (ethylene glycol) diglycidyl ether ($M_n$=500 and 2000 g/mol) with ACN-lignin at different compositions with 1% by weight triphenylphosphine as catalyst in the melt phase at 160° C. The ACN-lignin was first mixed with the PEG mixture at 160° C. for 30 minutes, and then the catalyst was added. The system was stirred and reacted for 30 minutes and then the system was moved to a polytetrafluoroethylene covered film in a vacuum hood and continued to react for 90 minutes. Two control samples were also prepared similarly, with one being 3,4-dihydroxyphenylacetic acid (DOPAc) with diglycidyl ether terminated PEG (Control 1) and the other one being the as-received lignin with the same PEG (Control 2). The two control samples were prepared under similar conditions, except that, for Control-1 sample with DOPAc, the reaction time was 20 hours. Notably, DOPAc is a derivative of 3,4-dihydroxyphenylalanine (DOPA), which is responsible for the strong adhesion of mussel (J. H. Waite et al., Science 212, 1038-1040, 1981).

Figure 2B:
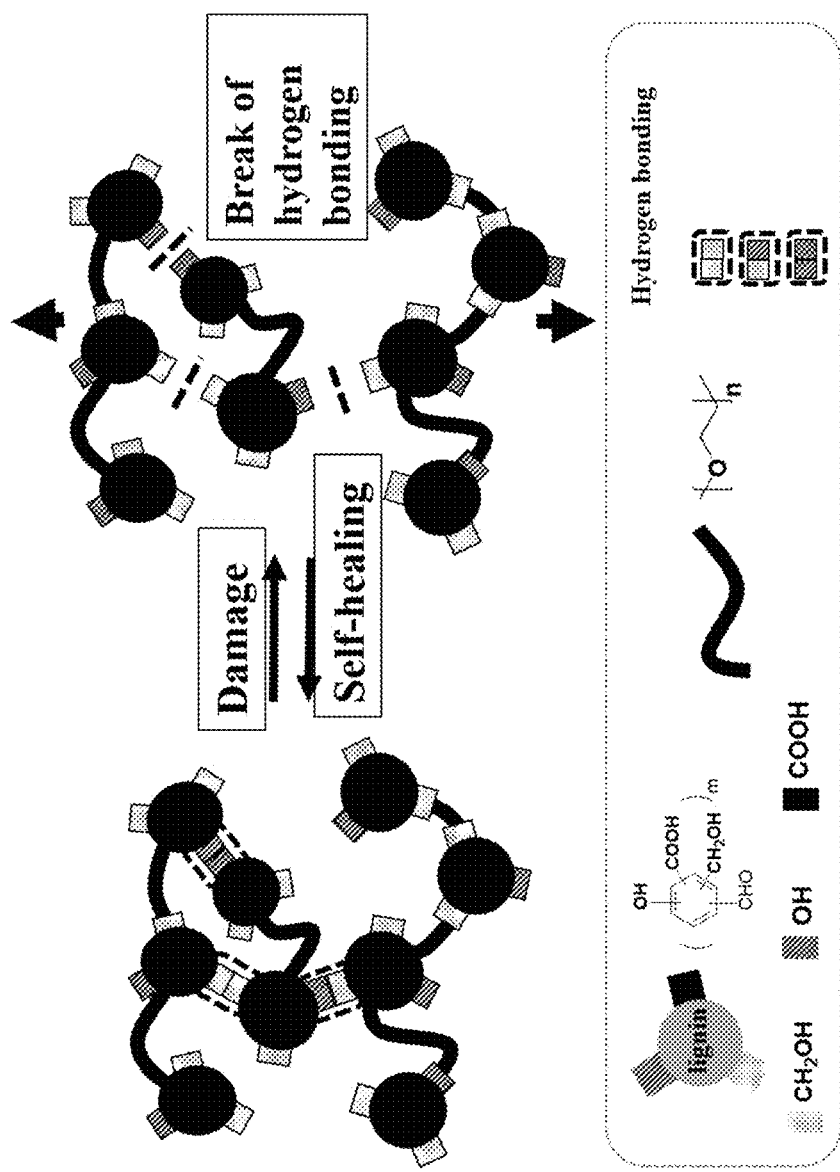
FIG. 2B is a schematic illustration of a lignin-PEG network made of coexisting covalent bonds and non-covalent bonds.

The result is a network containing both covalent and hydrogen bonds. FIG. 2B is a schematic illustration of a network formed by coexisting covalent bonds and noncovalent bonds. The reformation of hydrogen bonds not only contributes to the toughness by dissipating energy, but also contributes to the self-healing ability of material. The covalent bond is formed by successive reactions of the epoxy in PEG with the carboxylic acid, alcohol, and phenol in lignin. Meanwhile, the product of these reactions (i.e., esters, ethers, and secondary alcohols) further mingle with the starting materials (PEG and the diverse functional groups in lignin) and form abundant hydrogen bonds. In addition, the produced polymer contains both a hard segment contributed by lignin and a soft segment formed by PEG. While the hard segment provides the material with stiffness, the soft phase allows chain movement and ductility. The coupling of soft segment with the fractionated lignin lowers the glass transition temperature ($T_g$), which imparts greater toughness. Moreover, the presence of hydrogen bonds further contributes to the toughness and dissipates the energy by rupturing first and sacrificing themselves during force loading, which has been demonstrated in hydrogel and elastomer systems (e.g., J. P. Gong et al., Adv. Mater. 15, 1155-1168, 2003; and J. Y. Sun et al., Nature, 489, 133-136, 2012). The dynamic nature of hydrogen bonds allows them to reform after the force loading and to self-heal the materials. Therefore, the material is both tough and self-healing due to: (1) the coexistence of hard segments and soft segments in the polymer and (2) the coexistence of covalent bonds and hydrogen bonds in the material.

Figure 2C:
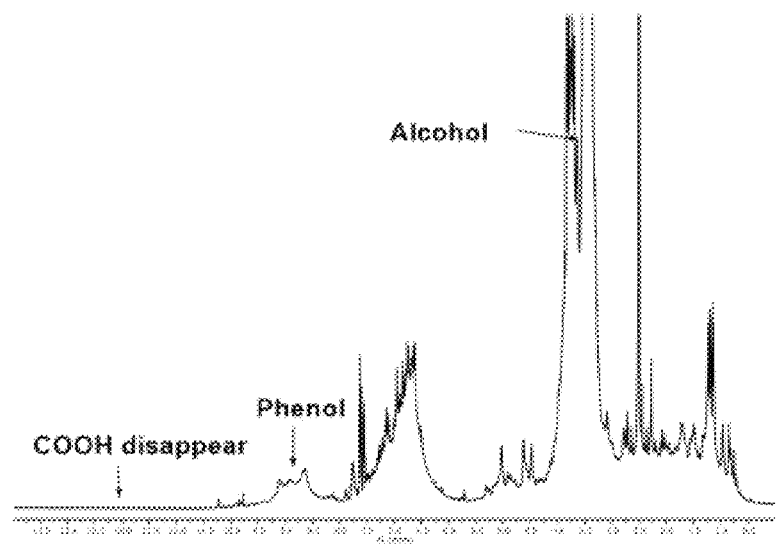
FIG. 2C shows the $^1$H-NMR of the ACN-lignin-PEG intermediate with a 20-minute reaction time.
Figure 2D:
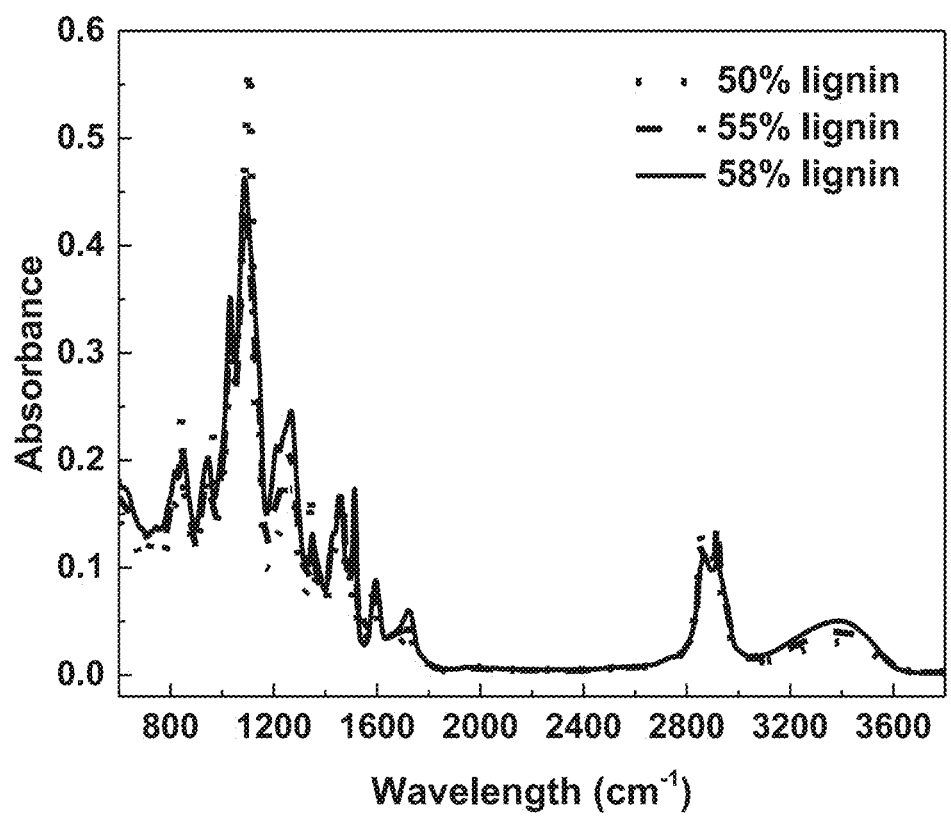
FIG. 2D shows FTIR spectra of the three self-healing materials from ACN-lignin.

Three samples with different lignin-to-PEG ratios were prepared to adjust the percentage of the rigid segment. Table 2, below, provides a summary of the relative amount of lignin and PEG components ($M_w$=500 and 2000 g/mol) used to prepare three self-healing materials (with 50 wt %, 55 wt %, and 58 wt % lignin) and two control samples. The two control samples were prepared similarly, with one being DOPAc with diglycidyl ether terminated PEG (Control 1) and the other one being the as-received lignin with the same PEG (Control 2). In all cases, the reactive groups in lignin or DOPAc were in excess. The amount of glycidyl ether was controlled by adjusting the molecular weight of the PEG (500 and 2000 g/mol) to avoid excessive crosslinking by covalent bond, or else it would reduce the mobility of the polymer chain as well as the self-healing ability. FIG. 2C shows the $^1$H-NMR spectrum of the ACN-lignin-PEG intermediate with a 20-minute reaction time. As shown in FIG. 2C, the functional groups reacted with glycidyl ether in an order from carboxylic acid to alcohol to phenol, and generated secondary alcohols. Therefore, the total amount of hydrogen bonds remained essentially unconsumed during the reaction. FIG. 2D shows FTIR spectra of the three self-healing materials from ACN-lignin. As shown in FIG. 2D, diverse hydrogen bonds among different functional groups exist in the product.

TABLE 2

Relative amounts of lignin and PEG components used to prepare three self-healing materials (from ACN-lignin) and two control samples

|  | Rigid segment | Soft segment (PEG) | |
| --- | --- | --- | --- |
| Samples | (lignin or DOPAc) | $M_n$ = 500 g/mol | $M_n$ = 200 g/mol |
| 1 | 50% (ACN) | 25% | 25% |
| 2 | 55% (ACN) | 25% | 20% |
| 3 | 58% (ACN) | 38% | 4% |
| Control-1 | 55% DOPAc | 25% | 20% |
| Control-2 | 55% (as received) | 25% | 20% |

Figures 3A, 3B, 3C, 3D:
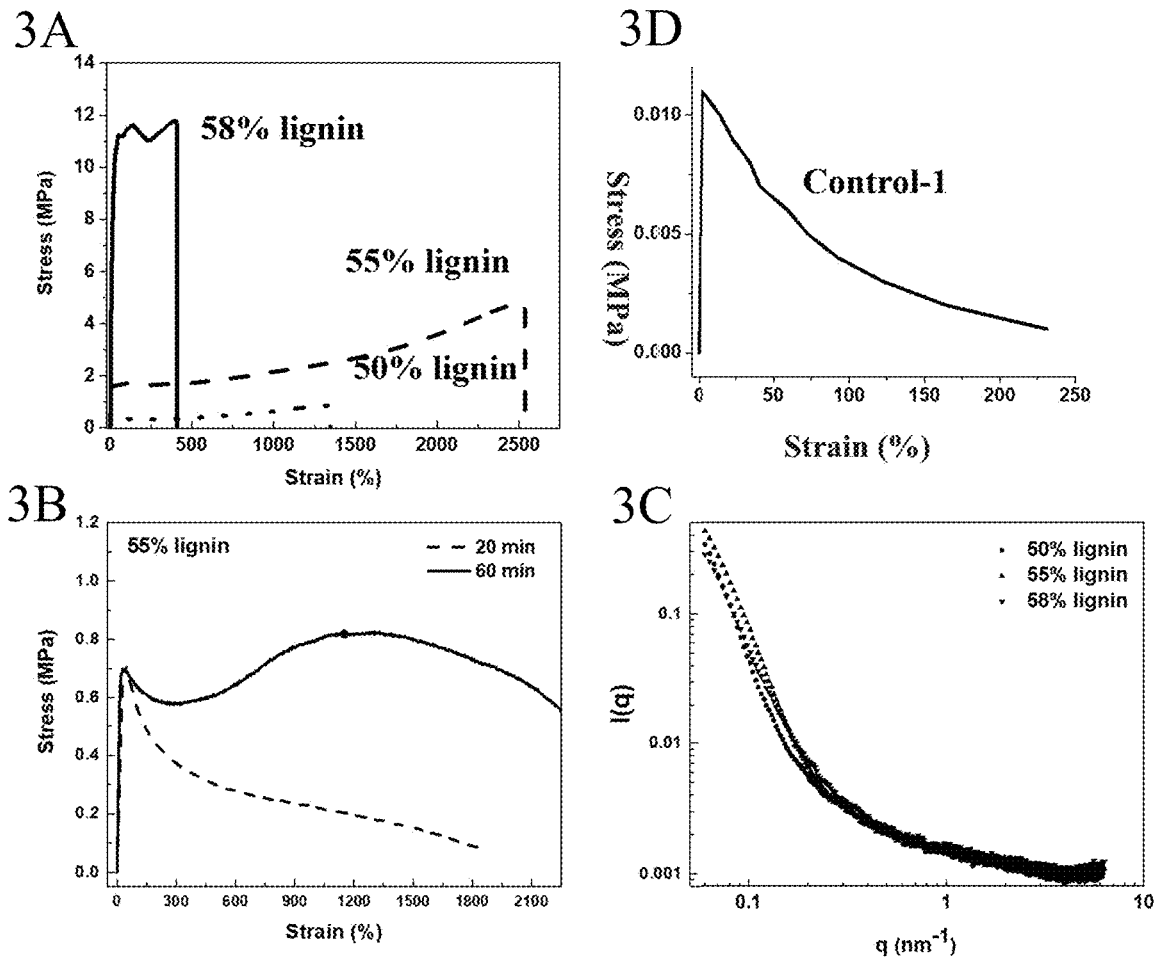
FIG. 3A shows stress-strain curves of three materials with different lignin compositions.
FIG. 3B shows stress-strain curves of a material containing 55% of ACN-lignin but prepared using a reaction time of 60 minutes and a shorter reaction time of 20 minutes, to demonstrate the importance of reaction time in producing sufficient covalent bonds.
FIG. 3C shows small angle X-ray scattering (SAXS) for three ACN-lignin-PEG elastomers (50%, 55%, and 58% lignin), all of which indicate a uniform structure.
FIG. 3D shows a stress-strain curve of the control copolymer (Control-1) of 3,4-dihydroxyphenylacetic acid (DOPAc) and PEG with 55% DOPAc content.

Unlike materials formed by supramolecular interactions, the copolymeric materials synthesized herein exhibit both stiffness and toughness due to the presence of rigid lignin and the coexistence of covalent and hydrogen bonds in the crosslinking network. FIG. 3A shows stress-strain curves of three materials with different lignin compositions and Control-1 with DOPAc. As evidenced by the data in FIG. 3A, both the elastic modulus and the tensile stress increased significantly when lignin content increased. Thus, the data shows that ACN-lignin is instrumental in imparting this superior mechanical property. For the 58% lignin sample, the elastic modulus reached 76.94±11.72 MPa while the tensile failure stress was around 12 MPa. The material was also highly stretchable with high stiffness. For example, when 55% of the composition is ACN-lignin, the material with an elastic modulus around 37 MPa can be stretched 22 times. The high stretchability arises from the unfolding and sliding of polymer chains as provided by the breaking and reforming of hydrogen bonds during stretching. The contribution of ACN-lignin is further exemplified when it is replaced with DOPAc, a known natural compound for adhesive application. As shown in FIG. 3D, the Control-1 sample with 55% DOPAc replacing ACN-lignin was sticky and showed very low strength and stiffness. This was because the phenol group in DOPAc is less reactive than the alcohol group in ACN-lignin, and the molecular weight of DOPAc is very low as well. If the lignin is not extracted, as seen in the Control-2 sample, it will form large domains (e.g., hundreds of microns) in the final material, thus producing a brittle product with very limited self-healing characteristics.

Another requisite for high mechanical performance is a sufficient polymer chain length to achieve chain entanglement. With a given composition, the growth of the polymer chain is directly affected by the reaction time. As shown in FIG. 3A, the material showed both stiffness and toughness after a two-hour (120 minute) reaction. FIG. 3B shows stress-strain curves of a material containing 55% of ACN-lignin but prepared using a reaction time of 60 minutes and a shorter reaction time of 20 minutes, to demonstrate the importance of reaction time in producing sufficient covalent bonds and the more established lignin-PEG networked copolymer system. As shown in FIG. 3B, if the reaction time is reduced to 20 minutes, it exhibits poor toughness. The lack of polymer entanglement leads to serious strain softening and lack of strain hardening, which reduces the material's toughness.

A uniform phase structure is also critical here for toughness, as phase-separated lignin domains will produce a brittle material, especially for the sample with a high lignin composition. FIG. 3C shows small angle X-ray scattering (SAXS) for three ACN-lignin-PEG elastomers (50%, 55%, and 58% lignin), all of which indicate a uniform structure. As shown in FIG. 3C, the SAXS did not reveal any peak from 1 nm to 100 nm, which indicates formation of a uniform and homogeneous material. Notably, when the lignin is not extracted or not properly dried after extraction, phase-separated domains appear (as observed by inspection using an optical microscope), and the toughness is reduced. Thus, in some embodiments, a completely dried lignin extract is preferred since this generally results in an absence of phase-separated domains.

Figures 3E, 3F, 3G, 3H:
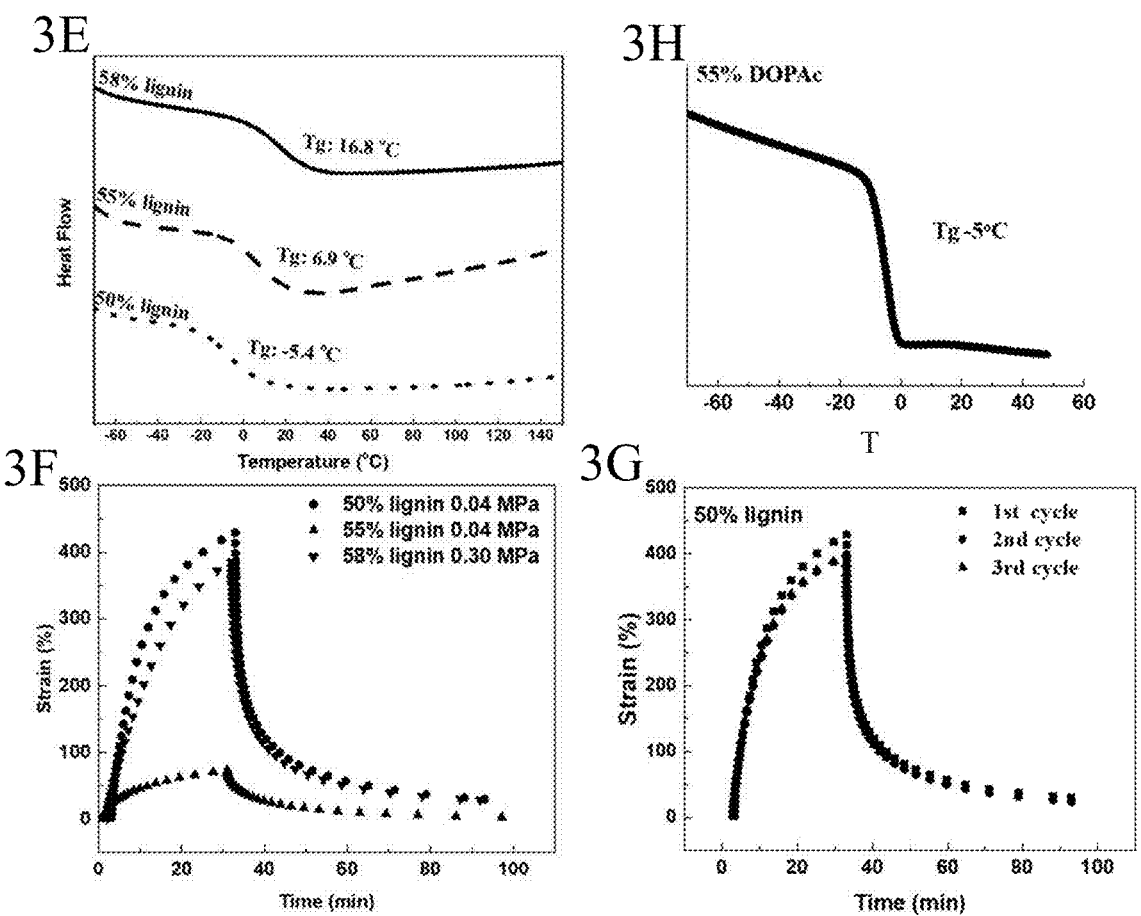
FIG. 3E shows DSC thermograms for three ACN-lignin-PEG elastomers (50%, 55%, and 58% lignin).
FIG. 3F is a graph showing creep recovery characterization of three materials under different conditions: the 50% lignin sample and 55% lignin sample at 0.04 MPa at 20° C., and the 58% lignin sample at 0.30 MPa at 35° C.
FIG. 3G is a cyclic test of the creep recovery characterization of the 55% lignin sample.
FIG. 3H shows a DSC thermogram of the Control-1 copolymer sample of DOPAc.

FIG. 3E shows DSC thermograms for three ACN-lignin-PEG elastomers (50%, 55%, and 58% lignin). FIG. 3H shows the results for the Control-1 with 55% DOPAc. The $T_g$ of the DOPAc-based Control-1 sample (−5° C.) is significantly less than that of the corresponding 55% ACN-lignin-PEG elastomer (6.9° C.). The lower molecular weight of DOPAc results in a low $T_g$ and a very weak and sticky substrate. As shown in FIG. 3E, higher lignin loading enhances the $T_g$ of the material (from −5.4° C. to 16.8° C.), and further increasing lignin content above 58% (i.e., >58%) leads to a glassy material with a $T_g$ of >20° C. This is ascribed to both the rigidity and network forming ability of lignin. No crystallization was observed for all three materials, perhaps due to the branched and irregular structure of lignin, which reduces the potential crystallization of PEG segments. Accordingly, the material's optimal working temperature depends on its composition and the desired mechanical property.

FIG. 3F is a graph showing creep recovery characterization of three materials under different conditions: the 50% lignin sample and 55% lignin sample at 0.04 MPa at 20° C., and the 58% lignin sample at 0.30 MPa at 35° C. As shown by FIG. 3F, all three samples exhibited a good shape recovery property after they were stretched by a fixed stress for 30 minutes. The 50% lignin and 55% lignin samples were displaced at 0.04 MPa at 20° C. for 30 minutes, and after 60 minutes from the withdrawal of applied stress, they both recovered about 93%. Remarkably, even when the sample was stretched to a high strain of about 100%, an 88% recovery was observed for the 55% lignin sample. Under similar conditions, however, only 50% recovery in 60 minutes recovery time was observed for the 58% lignin sample. This is because its $T_g$ is close to room temperature, and being less flexible it needs a longer time to recover. Therefore, as indicated above, another creep experiment was conducted for the 58% lignin sample at 35° C. (applied stress=0.30 MPa), and the results are also shown in FIG. 3F. Due to its higher stiffness, the 58% lignin sample was displaced at a higher stress (0.3 MPa). Approximately 91% recovery was observed under the new conditions. FIG. 3G is a cyclic test of the creep recovery characterization of the 55% lignin sample. The creep experiment was repeated three times for the 50% lignin sample with a 30-minute interval. As shown in FIG. 3G, the second and third creep curves almost overlap, differing only minimally from the first curve, which indicates that this material withstands multiple deformation cycles.

Figure 3I:
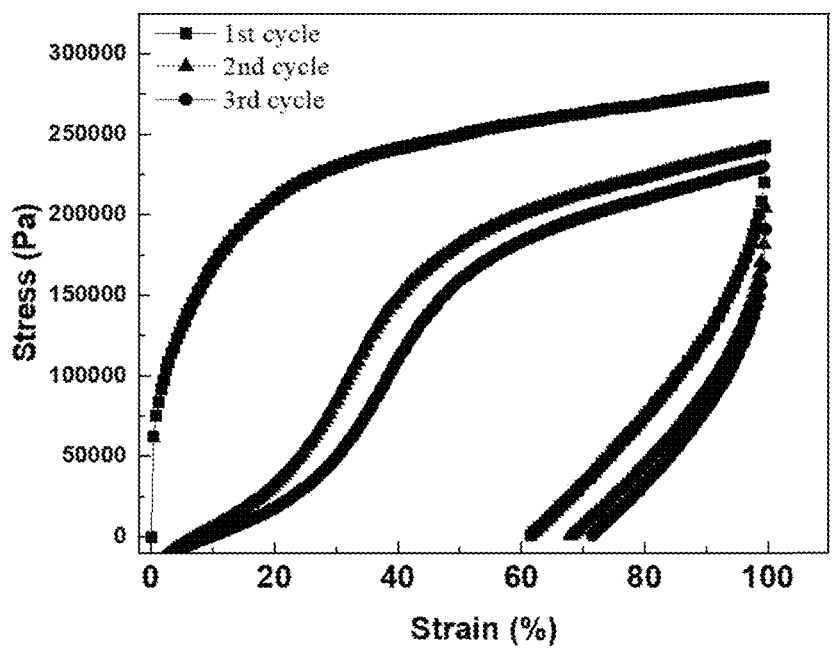
FIG. 3I is a graph showing the results of a cyclic stress-strain test of the 55% lignin sample.
Figure 3J:
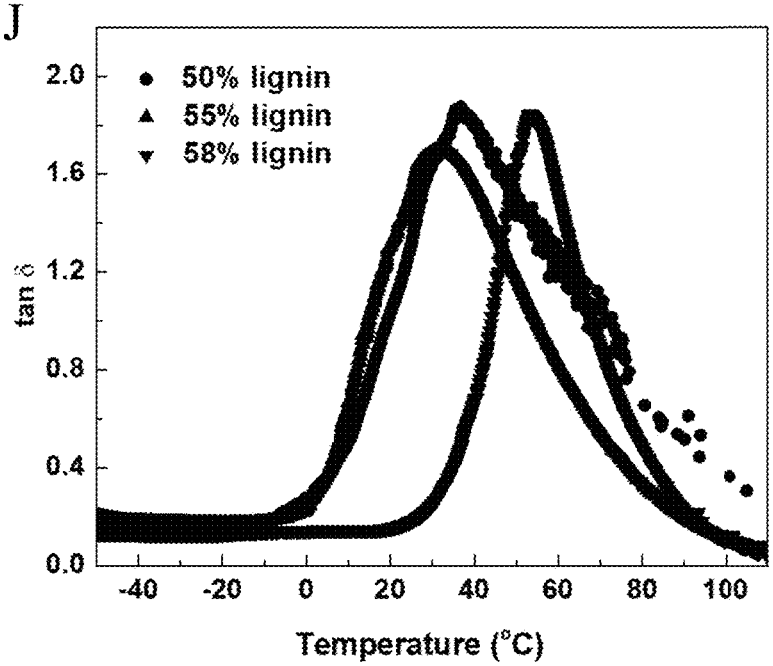
FIG. 3J is a graph showing the results of a dynamic mechanical analysis (DMA) test of the three 50%, 55%, and 58% ACN-lignin materials.

FIG. 3I is a graph showing the results of a cyclic stress-strain test of the 55% lignin sample. The energy dissipation capability of this material is evidenced by the pronounced hysteresis. The area between the loading and unloading curves of a material gives the energy dissipated per unit volume. A deformation still exists after immediate unloading during the cyclic stress-strain tests, but much of the remaining deformation disappeared after a 1-hour interval according to the creep test. FIG. 3J is a graph showing the results of a dynamic mechanical analysis (DMA) loss tangent (tan δ) spectra of the three materials. As shown in FIG. 3J, the high value of tan δ (1.75) also indicates an effective energy absorption property (damping characteristics) of the material.

A summary of the measured physical properties of the three samples and Control-1 are provided in Table 3 below.

TABLE 3

Glass transition temperatures, tensile stresses, elastic moduli, and elongation at break for the three lignin-PEG samples and Control-1.

| | $T_g$ (° C.) | Tensile Failure Stress (MPa) | Elastic Modulus (MPa) | Elongation at Break (%) |
|---|---|---|---|---|
| 1 | −5.4 | 1.59 ± 0.20 | 6.55 ± 0.83 | 1307.71 ± 23.59 |
| 2 | 6.9 | 4.58 ± 0.33 | 36.87 ± 3.91 | 2230.84 ± 432.52 |
| 3 | 16.8 | 12.20 ± 0.75 | 76.94 ± 11.72 | 353.58 ± 51.96 |
| Control-1 | −5.0 | ~0.011 | ~0.43 | ~230 |

Figure 4A:
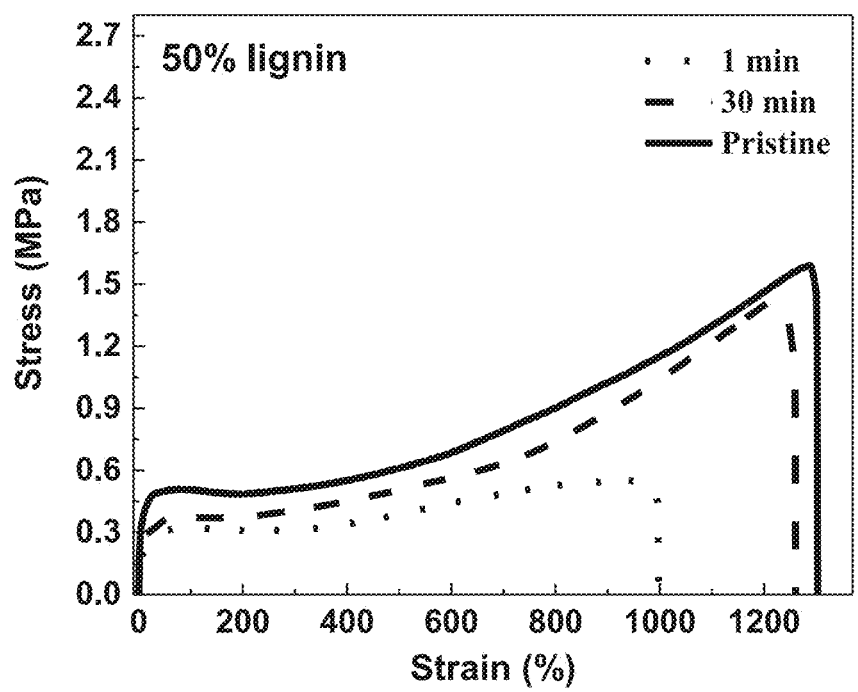
FIG. 4A is a graph showing stress-strain curves of the 50% ACN-lignin material with healing times of 1 minute and 30 minutes at room temperature.
Figure 4B:
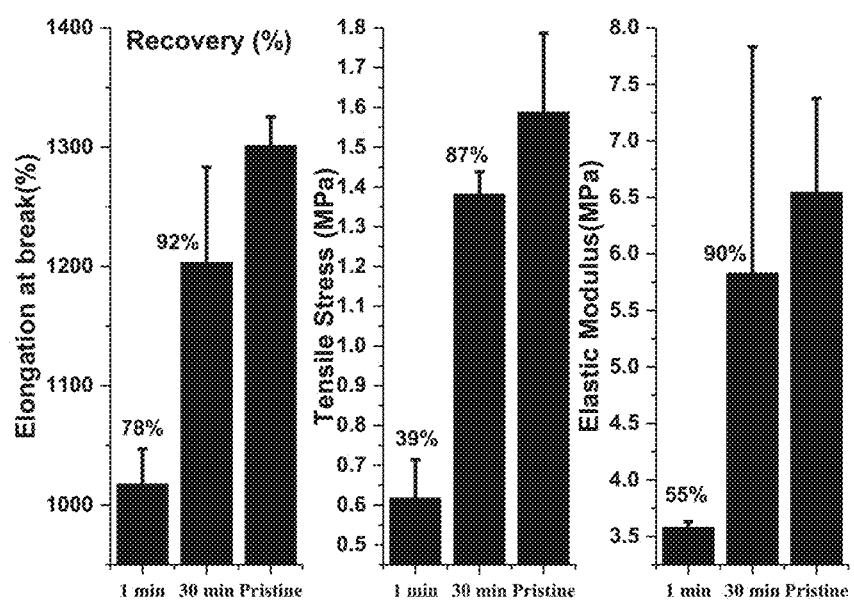
FIG. 4B shows three graphs (left, middle, and right panels) showing recovery performance in elongation at break, tensile stress, and elastic modulus, respectively, of the 50% ACN-lignin material with healing times of 1 minute and 30 minutes at room temperature.
Figure 4C:
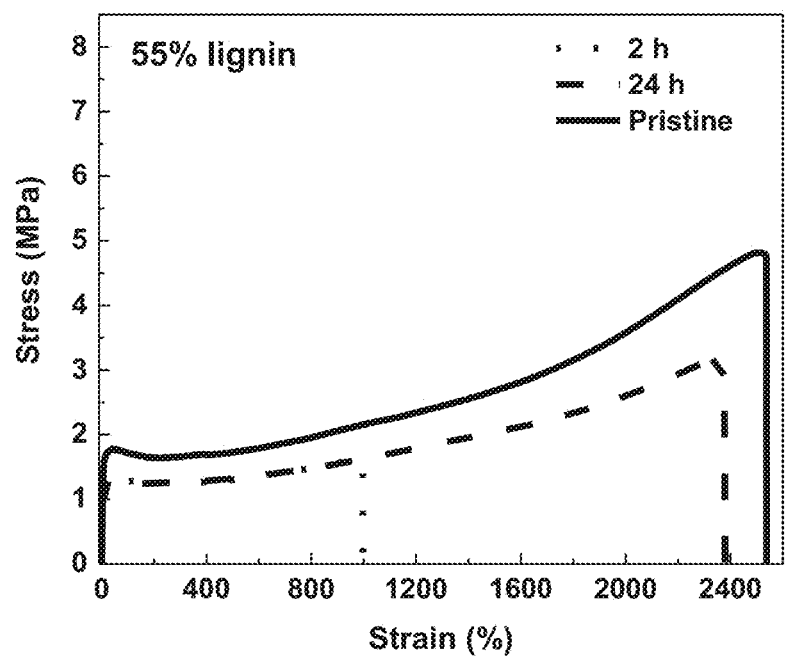
FIG. 4C is a graph showing stress-strain curves of the 55% ACN-lignin material with healing times of 2 hours and 24 hours at body temperature (37° C.).
Figure 4D:
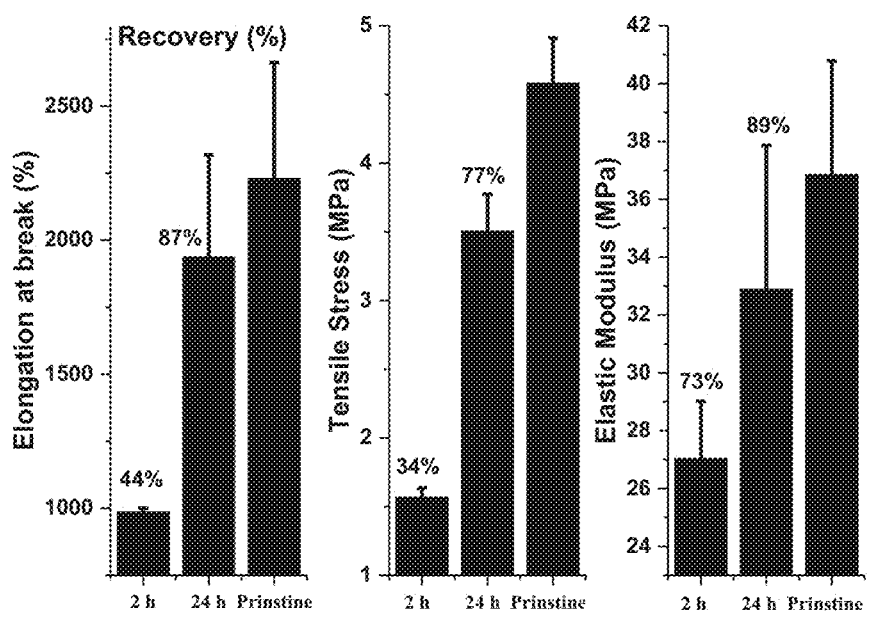
FIG. 4D shows three graphs (left, middle, and right panels) showing recovery performance in elongation at break, tensile stress, and elastic modulus, respectively, of the 55% ACN-lignin material with healing times of 2 hours and 24 hours at body temperature.

As indicated by the above experimental results, the self-healing ability of this series of elastomers is tunable by respective tuning of the composition. In this way, the elastomers may exhibit anywhere from instant self-healing at room temperature to slow self-healing at body temperature. The 50% ACN-lignin-PEG soft copolymer exhibited instant self-healing at room temperature (21.5° C.). The cut elastomer self-healed immediately after the cut surfaces contacted each other, while the elastomer was not observed to be sticky to other materials. FIG. 4A is a graph showing stress-strain curves of the 50% ACN-lignin-PEG copolymer with healing times of 1 minute and 30 minutes at room temperature. FIG. 4B is a graph showing recovery performance (in elongation at break, tensile stress, and elastic modulus) of the 50% ACN-lignin-PEG copolymer with healing times of 1 minute and 30 minutes at room temperature. As shown by FIGS. 4A and 4B, after only 1 minute, over 50% recovery was observed for the elastic modulus and the extension at break; and after 30 minutes, the material was almost fully recovered (~90% recovery of all characteristics). The instant self-healing ability is believed to arise at least in part from the plentiful hydrogen bonds as well as the low $T_g$ of PEG, both of which permit fast movement of polymer chain. In comparison with previously reported materials, the 50% lignin material exhibited an instant self-healing property while maintaining as good or better stiffness and toughness, which indicates that the two designs in the material averted the aforementioned trade-off. As the lignin content increased, the self-healing became slower due to an increased $T_g$ or loss of segmental mobility. FIG. 4C is a graph showing stress-strain curves of the 55% ACN-lignin-PEG copolymer with healing times of 2 hours and 24 hours at body temperature (37° C.). FIG. 4D is a graph showing recovery performance (in elongation at break, tensile stress, and elastic modulus) of the 55% ACN-lignin-PEG copolymer with healing times of 2 hours and 24 hours at body temperature. As shown by FIGS. 4C and 4D, the 55% lignin sample required 24 hours to self-heal at body temperature (37° C.) to get ~90% recovery of the tensile modulus and elongation at break. The strength recovery after self-healing at body temperature (37° C.) for this material was ~80%. The 58% lignin material also exhibited a self-healing property, but a higher temperature (100° C.) was required to get an observable level self-healing.

Figure 6A:
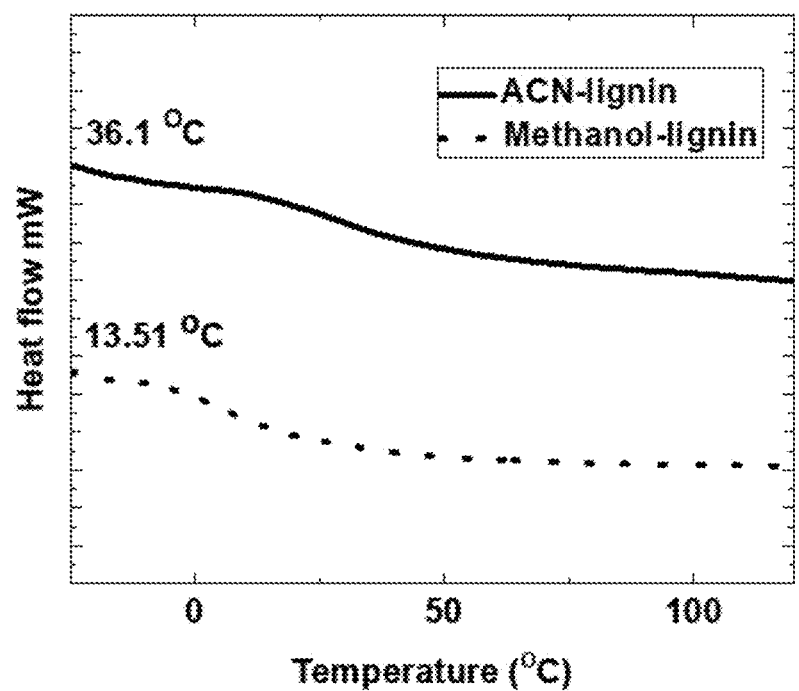
FIG. 6A shows the DSC thermogram of equal-mass blend of acrylonitrile-butadiene rubber (having 41 mol % nitrile content) and ACN lignin extract or the methanol extract of a Kraft softwood lignin. The stress-strain curves of corresponding blends are shown in FIG. 6B.
Figure 6B:
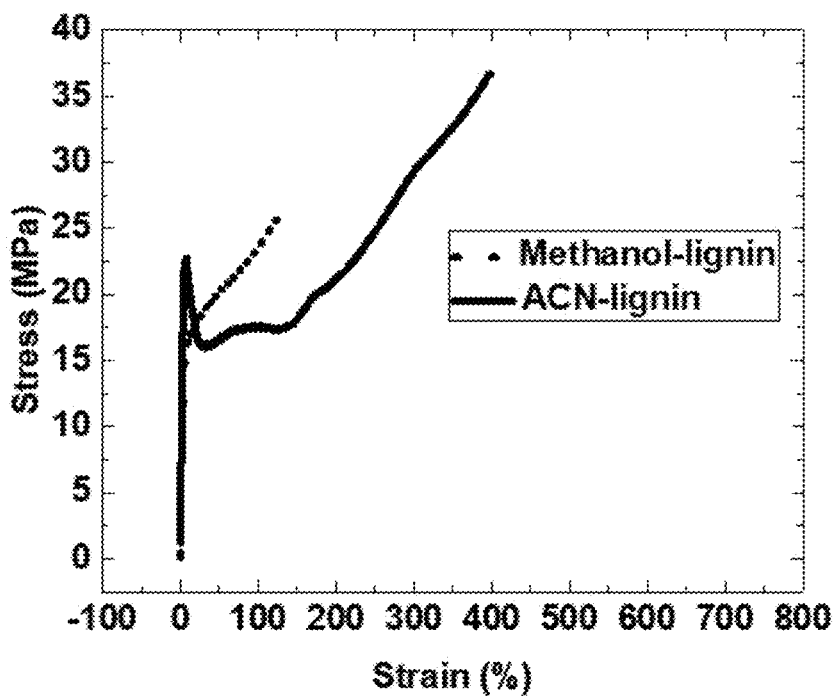

The value of this lignin extract is further demonstrated by the melt-phase blending of a tough thermoplastic composition with excellent performance and processability or moldability. The lignin-based thermoplastic blends were prepared by adding 50% ACN-lignin into the 41 mole % acrylonitrile containing NBR rubber melt (without the use of a solvent) to manufacture polymer blends using a reactive extrusion process [Tran et al. Advanced Functional Material, 26(16) 2677-2685 (2016)]. The DSC curve of ACN-lignin-based thermoplastic (FIG. 6A) exhibits a high glass transition temperature ($T_g$) around 36° C. As a control, a thermoplastic made from methanol extract of the same original showed a much lower $T_g$ (13° C.). The $T_g$ of the base nitrile rubber is −17° C. Such a high rise in $T_g$ of the rubber after incorporation of lignin ($\Delta T_g$=53° C. for ACN lignin vs. $\Delta T_g$=21° C. for as-received lignin) is unprecedented. This is due to the better binding of the functionally enriched ACN-lignin onto the rubber backbone. Other than the significant rise in $T_g$, the tensile failure stress (FIG. 6B) is also increased by 35%, and the strain at break doubled by use of ACN-lignin in the nitrile rubber composition. Notably, the melt-stable methanol extract of Kraft softwood lignin is known to produce a blend with nitrile rubber (41 mol % nitrile) with desirable properties [Tran et al. *Advanced Functional Materials*, 26(16), 2677-2685, 2016]. However, the data in FIG. 6B unexpectedly demonstrate that the ACN-lignin-nitrile rubber blend, as disclosed herein, is a significantly tougher and stronger product than the state of the art control material.

In summary, the above experimental details demonstrate a method for obtaining a valuable chemical substance (ACN-lignin) from a lignin waste stream, and using the valuable substance to produce a range of valuable elastomeric materials. The ACN-lignin has a uniform structure and diverse (and enriched) functional groups, which makes it a useful alternative to traditional chemicals used for self-healing materials and adhesives. The rigid lignin structure with multiple reactive groups and hydrogen bonds makes it ideal for synthesizing a simultaneously tough and self-healing material. The ACN-lignin-PEG elastomer series is tunable by composition, ranging from instant self-healing at room temperature to a very tough elastomer with slower self-healing. In particular, two design parameters in the material, i.e., the coexistence of covalent and hydrogen bonds and the coexistence of hard and soft segments, not only endows the material with self-healing ability but also make the material strong and tough. The process described above can employ at least 50% lignin and efficient melt-phase processing that excludes solvent usage or waste generation. Rigid, reactive, sustainable and affordable, this tailored lignin extract can be used in a number of applications, including self-healing, adhesive, hydrogel, and elastomer compositions.

While there have been shown and described what are at present considered the preferred embodiments of the invention, those skilled in the art may make various changes and modifications which remain within the scope of the invention defined by the appended claims.

What is claimed is:
1. A polymer blend or copolymer material comprising:
    (i) a lignin component comprising lignin compounds possessing 5-30 phenyl rings interconnected by ether and alkylene linkages and containing hydroxy and/or methoxy groups attached to said phenyl rings;
    wherein said lignin component possesses a glass transition temperature of 80-100° C. and a degree of substitution (DS) of carboxylic acid groups per phenyl ring of at least 0.5 and a DS of methoxy groups per phenyl ring of no more than 1.2;
    wherein at least 90 wt % of said lignin compounds has a molecular weight within a range of 500-5000 g/mol and/or wherein the molecular weight distribution of the lignin compounds is characterized by a polydispersity index of 1.0-1.5; and
    wherein other lignin compounds not possessing the above characteristics are not present; and
    (ii) an acrylonitrile-containing polymer component;
    wherein said lignin component is present in an amount of at least 5 wt % and up to about 95 wt % by total weight of components (i) and (ii).
2. The polymer blend or copolymer material of claim 1, wherein said lignin component comprises lignin compounds possessing 5-15 phenyl rings interconnected by ether and alkylene linkages and containing hydroxy and/or methoxy groups attached to said phenyl rings;
    wherein said composition possesses a glass transition temperature range having a median temperature within 80-100° C. and lower and upper temperature bounds of ±5° C. from the median temperature, and a degree of substitution (DS) of carboxylic acid groups per phenyl ring of at least 0.5 and a DS of methoxy groups per phenyl ring of no more than 1.2;

wherein at least 90 wt % of said lignin compounds has a molecular weight within a range of 1500-3000 g/mol and/or wherein the molecular weight distribution of the lignin compounds is characterized by a polydispersity index of 1.0-1.5; and wherein other lignin compounds not possessing the above characteristics are not present.

3. The polymer blend material of claim 1, wherein said acrylonitrile-containing polymer is nitrile butadiene rubber.

4. A polymer blend or copolymer material comprising:
(i) a lignin component comprising lignin compounds possessing 5-30 phenyl rings interconnected by ether and alkylene linkages and containing hydroxy and/or methoxy groups attached to said phenyl rings;

wherein said lignin component possesses a glass transition temperature of 80-100° C. and a degree of substitution (DS) of carboxylic acid groups per phenyl ring of at least 0.5 and a DS of methoxy groups per phenyl ring of no more than 1.2;

wherein at least 90 wt % of said lignin compounds has a molecular weight within a range of 500-5000 g/mol and/or wherein the molecular weight distribution of the lignin compounds is characterized by a polydispersity index of 1.0-1.5; and wherein other lignin compounds not possessing the above characteristics are not present; and (ii) a polyamide polymer component;

wherein said lignin component is present in an amount of at least 5 wt % and up to about 95 wt % by total weight of components (i) and (ii).

5. The polymer blend or copolymer material of claim 4, wherein said lignin component comprises lignin compounds possessing 5-15 phenyl rings interconnected by ether and alkylene linkages and containing hydroxy and/or methoxy groups attached to said phenyl rings;

wherein said composition possesses a glass transition temperature range having a median temperature within 80-100° C. and lower and upper temperature bounds of ±5° C. from the median temperature, and a degree of substitution (DS) of carboxylic acid groups per phenyl ring of at least 0.5 and a DS of methoxy groups per phenyl ring of no more than 1.2;

wherein at least 90 wt % of said lignin compounds has a molecular weight within a range of 1500-3000 g/mol and/or wherein the molecular weight distribution of the lignin compounds is characterized by a polydispersity index of 1.0-1.5; and wherein other lignin compounds not possessing the above characteristics are not present.

6. The polymer blend or copolymer material of claim 4, wherein said polyamide is a nylon.

* * * * *